United States Patent
Nishikawa

(10) Patent No.: US 8,983,531 B2
(45) Date of Patent: Mar. 17, 2015

(54) COMMUNICATION DEVICE

(71) Applicant: Naoki Nishikawa, Nagoya (JP)

(72) Inventor: Naoki Nishikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 11 days.

(21) Appl. No.: 13/951,821

(22) Filed: Jul. 26, 2013

(65) Prior Publication Data

US 2014/0031078 A1    Jan. 30, 2014

(30) Foreign Application Priority Data

Jul. 27, 2012  (JP) ................................ 2012-167251

(51) Int. Cl.
   *H04M 1/00*   (2006.01)
   *H04W 40/24*  (2009.01)
   *H04W 48/00*  (2009.01)

(52) U.S. Cl.
   CPC .............. *H04W 40/24* (2013.01); *H04W 48/00* (2013.01)
   USPC ...................................... 455/552.1; 455/41.2

(58) Field of Classification Search
   USPC .................. 455/550.1, 552.1, 553.1, 73, 41.2
   See application file for complete search history.

(56) References Cited

U.S. PATENT DOCUMENTS

| | | | | |
|---|---|---|---|---|
| 8,774,144 B2 * | 7/2014 | Nogawa | ......................... | 370/338 |
| 2006/0106918 A1 * | 5/2006 | Evert et al. | ................... | 709/220 |
| 2010/0067406 A1 * | 3/2010 | Suzuki | ........................ | 370/254 |
| 2010/0082999 A1 * | 4/2010 | Ando et al. | ................... | 713/183 |
| 2014/0010133 A1 * | 1/2014 | Roebke et al. | ................ | 370/311 |

FOREIGN PATENT DOCUMENTS

| | | |
|---|---|---|
| JP | 2010-178002 A | 8/2010 |
| JP | 2012-085136 A | 4/2012 |

\* cited by examiner

*Primary Examiner* — Ajit Patel
(74) *Attorney, Agent, or Firm* — Banner & Witcoff, Ltd.

(57) ABSTRACT

A first communication device is configured to: transmit first wireless settings for joining to a first type of wireless network to a second communication device in a first case where the second communication device can join the first type of wireless network in a specific mode for performing direct wireless communication with the first communication device; transmit second wireless settings for joining to a second type of wireless network to the second communication device in a second case where the second communication device cannot join the first type of wireless network in the specific mode; perform direct wireless communication with the second communication device using the first type of wireless network in the first case; and perform wireless communication of the target data with the second communication device through a specific relaying device using the second type of wireless network in the second case.

13 Claims, 10 Drawing Sheets

FIG. 5

| EXAMPLE | INFORMATION OF PORTABLE DEVICE SIDE | AP SELECTING PROCESS |
|---|---|---|
| 1-1 | SECURITY INFORMATION REPRESENTING EXISTENCE OR NON-EXISTENCE OF PASSWORD | SELECT AP USING "AES" IF SECURITY INFORMATION REPRESENTS SECURENESS, AND SELECT AP USING AUTHENTICATION SCHEME OTHER THAN "AES" IF SECURITY INFORMATION REPRESENTS INSECURENESS |
| 1-2 | SECURITY INFORMATION REPRESENTING EXISTENCE OR NON-EXISTENCE OF PASSWORD | SELECT AP USING "WPA2" IF SECURITY INFORMATION REPRESENTS SECURENESS, AND SELECT AP USING AUTHENTICATION SCHEME OTHER THAN "WPA2" IF SECURITY INFORMATION REPRESENTS INSECURENESS |
| 1-3 | SECURITY INFORMATION REPRESENTING EXISTENCE OR NON-EXISTENCE OF ENCRYPTION | SELECT AP USING "AES" IF SECURITY INFORMATION REPRESENTS SECURENESS, AND SELECT AP USING AUTHENTICATION SCHEME OTHER THAN "AES" IF SECURITY INFORMATION REPRESENTS INSECURENESS |
| 1-4 | SECURITY INFORMATION REPRESENTING EXISTENCE OR NON-EXISTENCE OF ENCRYPTION | SELECT AP USING "WPA2" IF SECURITY INFORMATION REPRESENTS SECURENESS, AND SELECT AP USING AUTHENTICATION SCHEME OTHER THAN "WPA2" IF SECURITY INFORMATION REPRESENTS INSECURENESS |
| 1-5 | INFORMATION ON SIZE OF PRINT DATA | SELECT AP WHICH REALIZES COMMUNICATION RATE OF 100Mbps OR MORE, IF SIZE IS EQUAL TO OR GREATER THAN THRESHOLD VALUE, AND SELECT AP WHICH REALIZES COMMUNICATION RATE LESS THAN 100Mbps, IF SIZE IS LESS THAN THRESHOLD VALUE |
| 1-6 | INFORMATION ON FORMAT OF PRINT DATA | SELECT AP WHICH REALIZES COMMUNICATION RATE OF 100Mbps OR MORE, IF DATA FORMAT IS "UNCOMPRESSED BITMAP", AND SELECT AP WHICH REALIZES COMMUNICATION RATE LESS THAN 100Mbps, IF DATA FORMAT IS OTHER THAN "UNCOMPRESSED BITMAP" |
| 1-7 | INFORMATION ON CPU OCCUPANCY RATE OF PORTABLE DEVICE | SELECT AP WHICH REALIZES COMMUNICATION RATE OF 100Mbps OR MORE, IF CPU OCCUPANCY RATE IS EQUAL TO OR GREATER THAN THRESHOLD VALUE, AND SELECT AP WHICH REALIZES COMMUNICATION RATE LESS THAN 100Mbps, IF CPU OCCUPANCY RATE IS LESS THAN THRESHOLD VALUE |
| 1-8 | INFORMATION ON RESIDUAL MEMORY AMOUNT OF PORTABLE DEVICE | SELECT AP WHICH REALIZES COMMUNICATION RATE OF 100Mbps OR MORE, IF RESIDUAL MEMORY AMOUNT IS EQUAL TO OR GREATER THAN THRESHOLD VALUE, AND SELECT AP WHICH REALIZES COMMUNICATION RATE LESS THAN 100Mbps, IF RESIDUAL MEMORY AMOUNT IS LESS THAN THRESHOLD VALUE |
| 1-9 | INFORMATION ON PRINT DATA PROCESSING SPEED OF PORTABLE DEVICE | SELECT AP WHICH REALIZES COMMUNICATION RATE OF 100Mbps OR MORE, IF PRINT DATA PROCESSING SPEED IS EQUAL TO OR GREATER THAN THRESHOLD VALUE, AND SELECT AP WHICH REALIZES COMMUNICATION RATE LESS THAN 100Mbps, IF PRINT DATA PROCESSING SPEED IS LESS THAN THRESHOLD VALUE |

FIG. 6

| EXAMPLE | INFORMATION OF MFP SIDE | AP SELECTING PROCESS |
|---|---|---|
| 2-1 | INFORMATION ON CPU OCCUPANCY RATE OF MFP | SELECT AP WHICH REALIZES COMMUNICATION RATE OF 100Mbps OR MORE, IF CPU OCCUPANCY RATE IS EQUAL TO OR GREATER THAN THRESHOLD VALUE, AND SELECT AP WHICH REALIZES COMMUNICATION RATE LESS THAN 100Mbps, IF CPU OCCUPANCY RATE IS LESS THAN THRESHOLD VALUE |
| 2-2 | INFORMATION ON RESIDUAL MEMORY AMOUNT OF MFP | SELECT AP WHICH REALIZES COMMUNICATION RATE OF 100Mbps OR MORE, IF RESIDUAL MEMORY AMOUNT IS EQUAL TO OR GREATER THAN THRESHOLD VALUE, AND SELECT AP WHICH REALIZES COMMUNICATION RATE LESS THAN 100Mbps, IF RESIDUAL MEMORY AMOUNT IS LESS THAN THRESHOLD VALUE |
| 2-3 | INFORMATION ON PRINT DATA PROCESSING SPEED OF MFP | SELECT AP WHICH REALIZES COMMUNICATION RATE OF 100Mbps OR MORE, IF PRINT DATA PROCESSING SPEED IS EQUAL TO OR GREATER THAN THRESHOLD VALUE, AND SELECT AP WHICH REALIZES COMMUNICATION RATE LESS THAN 100Mbps, IF PRINT DATA PROCESSING SPEED IS LESS THAN THRESHOLD VALUE |

FIG. 7

| EXAMPLE | INFORMATION OF PORTABLE DEVICE SIDE | INFORMATION OF MFP SIDE | AP SELECTING PROCESS |
|---|---|---|---|
| 3-1 | SECURITY INFORMATION REPRESENTING EXISTENCE OR NON-EXISTENCE OF PASSWORD | INFORMATION ON CPU OCCUPANCY RATE OF MFP | SELECT AP WHICH USES ENCRYPTION SCHEME "AES" AND REALIZES COMMUNICATION RATE OF 100Mbps OR MORE, IF SECURITY INFORMATION REPRESENTS SECURENESS AND CPU OCCUPANCY RATE IS EQUAL TO OR GREATER THAN THRESHOLD VALUE, AND SELECT AP WHICH USES ENCRYPTION SCHEME "AES" AND REALIZES COMMUNICATION RATE LESS THAN 100Mbps, IF SECURITY INFORMATION REPRESENTS SECURENESS AND CPU OCCUPANCY RATE IS LESS THAN THRESHOLD VALUE, AND SELECT AP WHICH USES ENCRYPTION SCHEME OTHER THAN "AES" AND REALIZES COMMUNICATION RATE OF 100Mbps OR MORE, IF SECURITY INFORMATION REPRESENTS INSECURENESS AND CPU OCCUPANCY RATE IS EQUAL TO OR GREATER THAN THRESHOLD VALUE, AND SELECT AP WHICH USES ENCRYPTION SCHEME OTHER THAN "AES" AND REALIZES COMMUNICATION RATE LESS THAN 100Mbps, IF SECURITY INFORMATION REPRESENTS INSECURENESS AND CPU OCCUPANCY RATE IS LESS THAN THRESHOLD VALUE |
| 3-2 | VARIOUS COMBINATIONS OF EXAMPLES 1-1 TO 1-9 OF FIG. 5 AND EXAMPLES 2-1 TO 2-3 OF FIG. 6 | | |

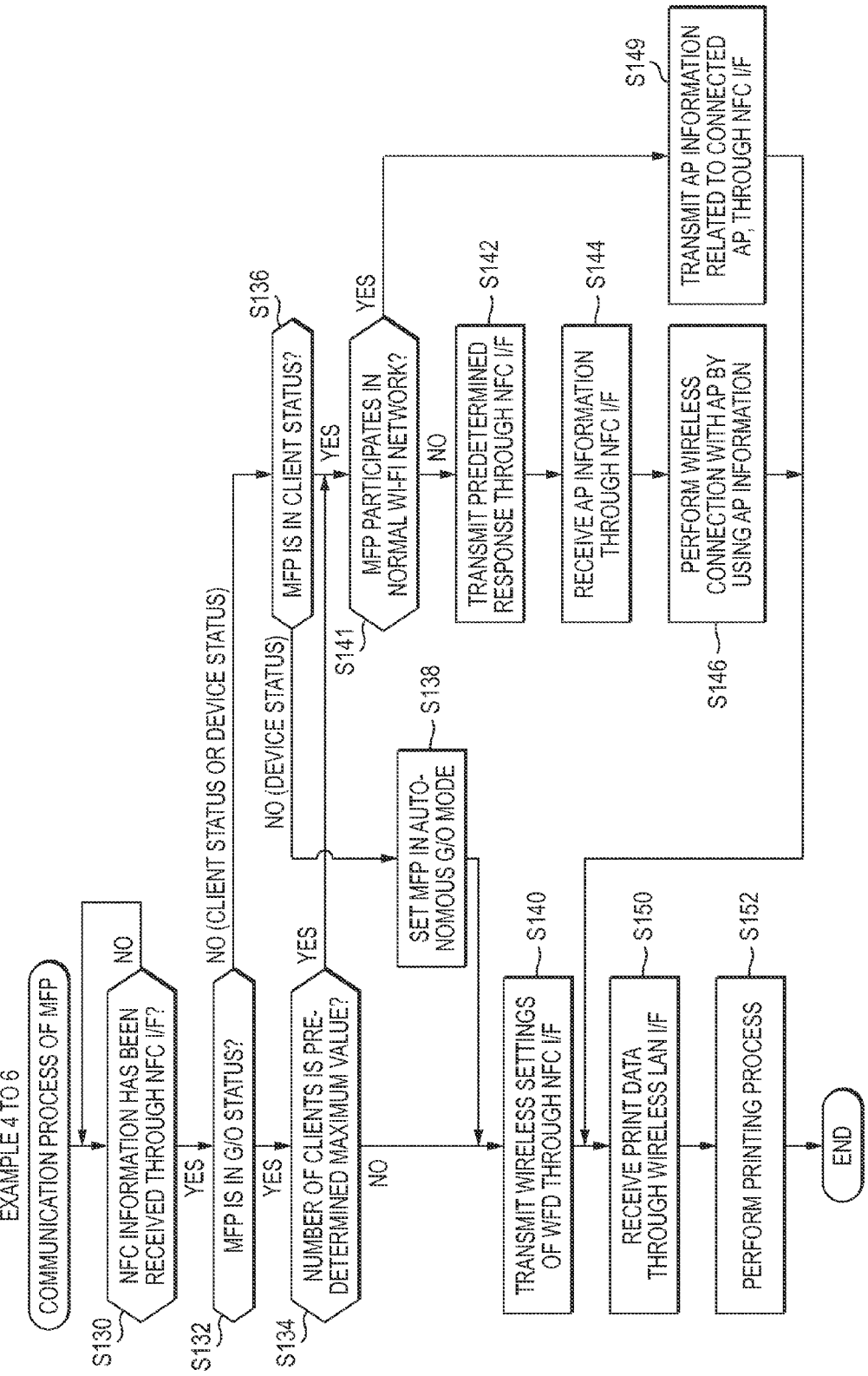

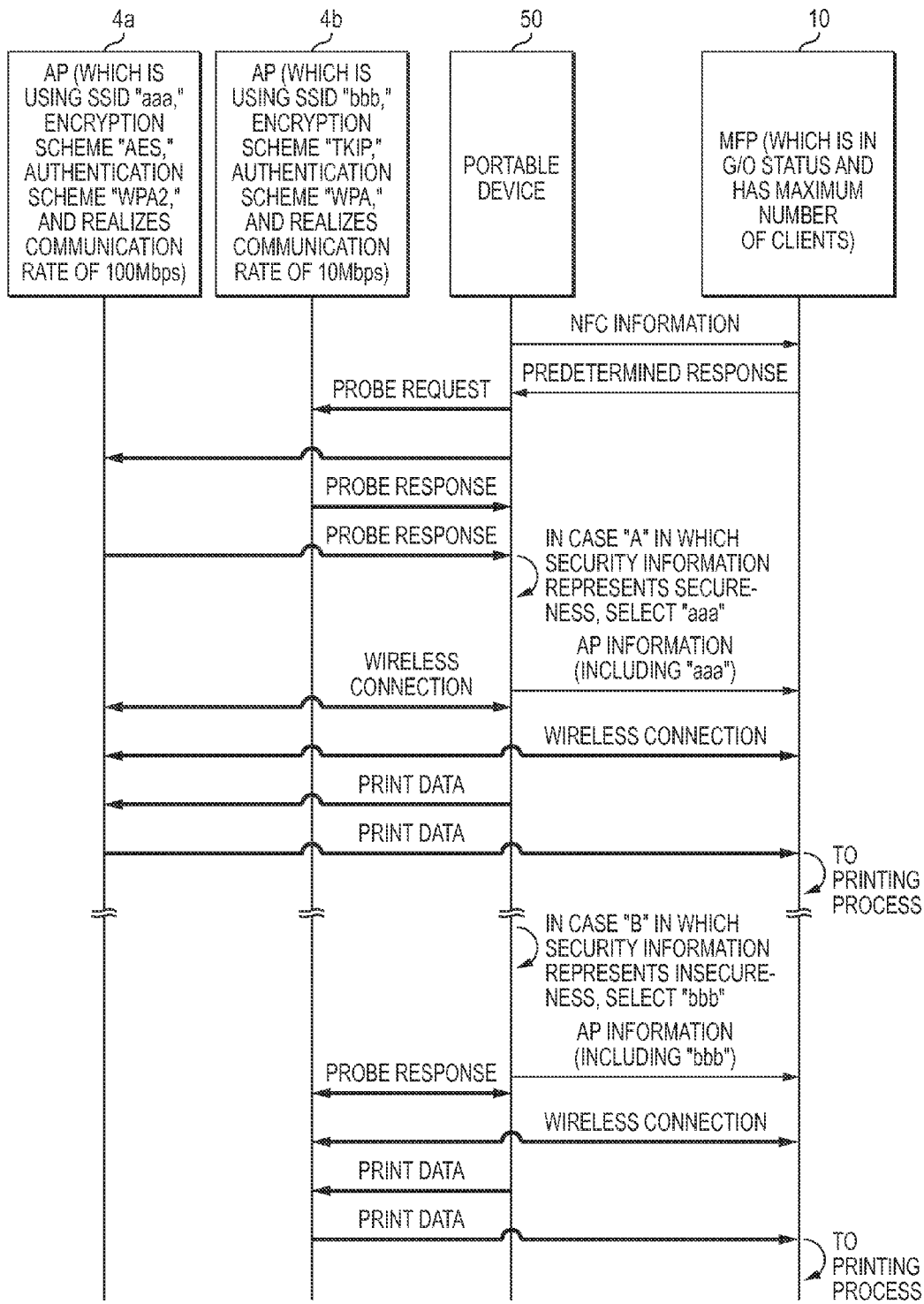

COMMUNICATION DEVICE

CROSS-REFERENCE TO RELATED APPLICATIONS

This application claims priority from Japanese Patent Application No. 2012-167251 filed on Jul. 27, 2012, the entire subject matter of which is incorporated herein by reference.

TECHNICAL FIELD

Illustrative aspects of the present invention relate to a first communication device configured to perform wireless communication of target data with a second communication device.

BACKGROUND

There has been proposed a system including an initiator, which is a wireless communication device for transmitting data, and a target that is a wireless communication device for receiving the corresponding data. In a case where a size of data planed to be transmitted to the target is equal to or less than a threshold value, the initiator uses NFC (which is an abbreviation for near field communication) to transmit the data to the target. Meanwhile, in a case where the size of data planed to be transmitted to the target is larger than the threshold value, the initiator performs a connection handover from NFC to Bluetooth (which is a registered trademark), and uses Bluetooth (which is a registered trademark) to transmit the data to the target.

SUMMARY

Illustrative aspects of the present invention provide a first communication device capable of appropriately performing wireless communication of target data with a second communication device.

According to one illustrative aspect of the present invention, there is provided a first communication device configured to operate in a master status or in a slave status and belong to a first type of wireless network. The first communication device comprises: a processor: and a memory storing computer readable instructions that, when executed by the processor, causing the first communication device to operate as a transmitting unit and a communicating unit. The transmitting unit is configured to: transmit first wireless settings, which is for joining to the first type of wireless network, to a second communication device in a first case where the second communication device can join the first type of wireless network in a specific mode for performing direct wireless communication with the first communication device without intermediating of a relaying device; and transmit second wireless settings, which is for joining to a second type of wireless network, to the second communication device in a second case where the second communication device cannot join the first type of wireless network in the specific mode, wherein the second type of wireless network includes a specific relaying device configured separately from the first communication device and the second communication device. The communicating unit is configured to: in the first case, perform direct wireless communication of target data with the second communication device by using the first type of wireless network; and in the second case, perform wireless communication of the target data with the second communication device through the specific relaying device by using the second type of wireless network.

According thereto, the first communication device is able to appropriately transmit the first wireless settings or the second wireless settings to the second communication device according to whether it is possible for the second communication device set in the specific mode to join the first type of wireless network. Therefore, the first communication device is able to appropriately perform control such that the second communication device joins the first or second type of wireless network. As a result, the first communication device is able to appropriately use the first or second type of wireless network to perform wireless communication of target data with the second communication device.

Control methods and computer programs for implementing the above-described first communication device, and computer-readable recording medium storing the corresponding computer programs may also be new and useful. Further, communication systems including the above-described first communication device and the above-described second communication device may be new and useful.

BRIEF DESCRIPTION OF THE DRAWINGS

FIG. 5 illustrates a table representing an outline of Example 1;

FIG. 6 illustrates a table representing the outline of Example 2;

FIG. 7 illustrates a table representing the outline of Example 3;

FIG. 9 illustrates a flow chart of another communication process of the MFP; and FIG. 10 illustrates a sequence diagram representing other communication and processes which the MFP and the portable device perform.

DETAILED DESCRIPTION

Exemplary embodiments of the present invention will now be described with reference to the drawings.

Example 1

Configuration of Communication System 2

Figure 1:
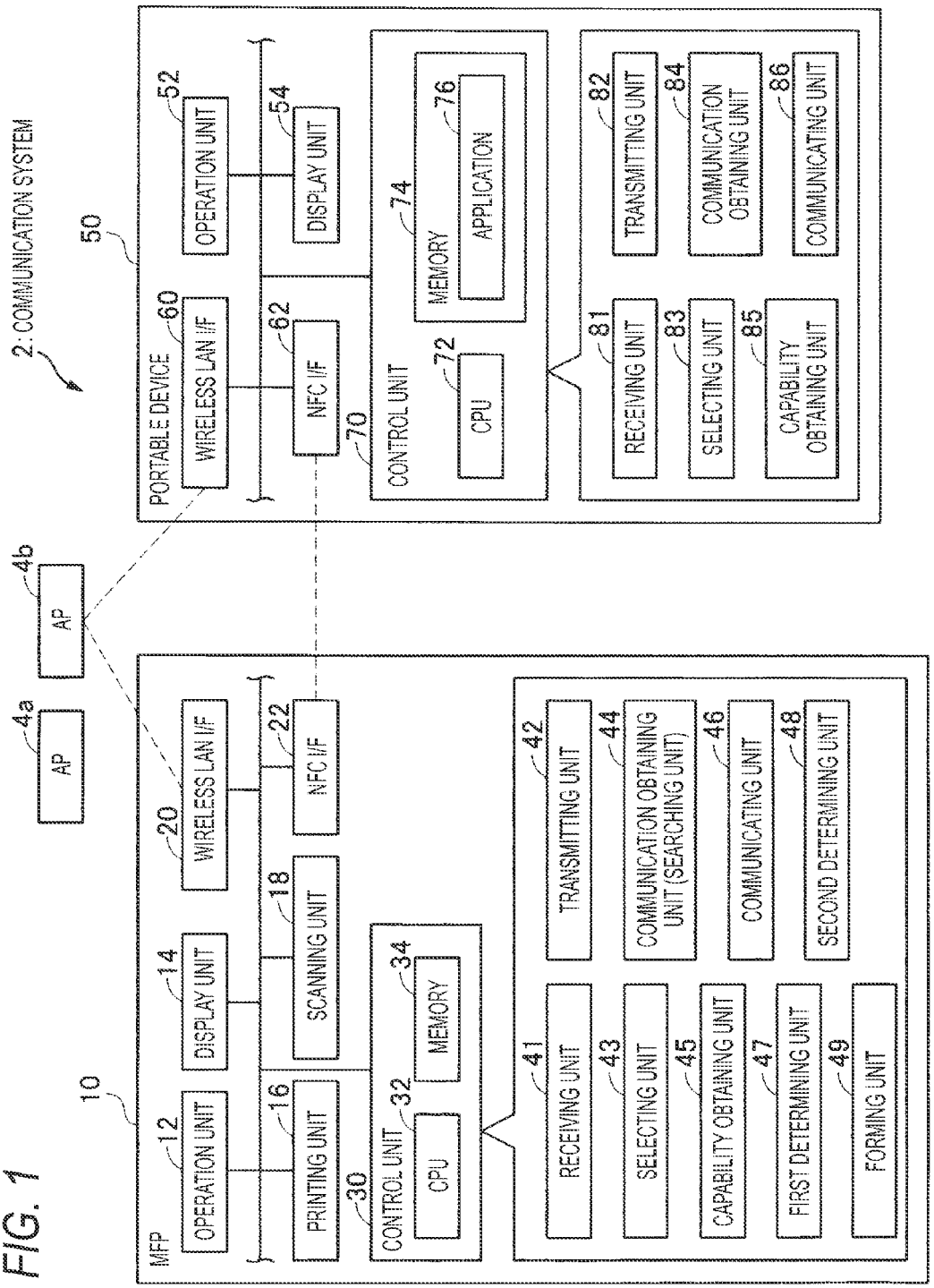
FIG. 1 illustrates a configuration of a communication system.

As shown in FIG. 1, a communication system 2 includes a plurality of access points (hereinafter, referred to simply as APs) 4a and 4b, a multi-function peripheral (hereinafter, referred to simply as a MFP) 10 and a portable device 50. Incidentally, the number of APs included in the communication system 2 is not limited to two, and may be three or more.

(Types of Wireless Communication which Mfp 10 can Perform)

The MFP 10 is configured to perform wireless communication according to a Near Field Communication (referred to simply as NFC) mode, wireless communication according to a Wi-Fi Direct (referred to simply as WFD) mode, and wireless communication according to a normal Wi-Fi mode. Hereinafter, wireless communications according to the above-described individual modes will be referred to as "NFC communication", "WFD communication" and "normal Wi-Fi communication", respectively.

(NFC Communication)

An NFC mode is a wireless communication mode for so-called Near Field Communication, and is, for example, a wireless communication mode based on international standards of ISO/IEC 21481 or 18092. The MFP 10 can perform NFC communication with the portable device 50.

(WFD Communication)

A WFD mode is a wireless communication mode described in "Wi-Fi Peer-to-Peer (P2P) Technical Specification v1.1" created by Wi-Fi Alliance. The WFD mode is, for example, a wireless communication mode for performing wireless communication according to the IEEE 802.11 standard by IEEE (which is an abbreviation for the Institute of Electrical and Electronics Engineers) and standards based on the IEEE 802.11 standard (for example, 802.11a, 802.11b, 802.11g, 802.11n, etc.).

The MFP 10 can join a WFD network and perform WFD communication of target data with other devices on the corresponding WFD network. Target data is data including information of the network layer of the OSI reference model. The target data includes, for example, print data, scan data, etc.

Hereinafter, devices capable of performing WFD communication like the MFP 10 will be referred to as "WFD-compliant devices". In the above-described WFD specification, as statuses of a WFD-compliant device, three statuses, that is, a group owner status (hereinafter, referred to as a "G/O status"), a client status, and a device status have been defined. WFD-compliant devices can selectively operate in one status of the above-described three statuses.

When a pair of WFD-compliant devices set in the device status needs to form a WFD network, generally, wireless communication called G/O negotiation is performed between the corresponding pair of WFD-compliant devices. In the G/O negotiation, one of the corresponding pair of WFD-compliant devices is determined to be the G/O status, and the other of the corresponding pair of WFD-compliant devices is determined to be the client status. A device set in the G/O status (hereinafter, referred to as a "G/O device") and a device set in the client status (hereinafter, referred to as a "client device") configures a WFD network. In a WFD network, one G/O device and one or more client devices may exist. The G/O device is configured to manage one or more client devices. Specifically, with respect to each of the one or more client devices, the G/O device performs authentication of the corresponding client device. Then, in a case where the G/O device succeeds in the authentication of the corresponding client device, the G/O device describes the ID information (that is, MAC address) of the corresponding client device in a management list stored in a memory of the G/O device. Also, in the present example, in a WFD network which the MFP 10 belongs to, a G/O device (that is, the MFP 10, or a G/O device different from the MFP 10) uses an authentication scheme "WPA2" and an encryption scheme "AES" to perform authentication of each client device. If a client device pulls out of the WFD network, the G/O device erases the ID information of the corresponding client device from the management list.

The G/O device can perform wireless communication of target data with each client device registered in the management list. However, with respect to an unregistered device which has not been registered in the management list, the G/O device may perform wireless communication of specific data necessary for the corresponding unregistered device to join the WFD network; however, the G/O device cannot perform wireless communication of target data. Specific data is data which does not include information of the network layer of the OSI reference model, and includes data of the physical layer such as a Probe Request signal (hereinafter, referred to as a "PReq signal") and a Probe Response signal (hereinafter, referred to as a "PRes signal"). Also, the G/O device can relay wireless communication of target data between a plurality of client devices.

A WFD-compliant device which does not belong to the WFD network (that is, an unregistered device which has not been registered in the management list of the G/O device) is a device being in the device status. A device being in the device status can perform wireless communication of the above-described specific data necessary for joining the WFD network with the G/O device; however, the device cannot perform wireless communication of the above-described target data with the G/O device or a client device.

As described above, in the WFD network, one pair of WFD-compliant devices can perform WFD communication of target data without an intermediating of an AP configured separately from those WFD-compliant devices. That is, the WFD communication means wireless communication without intermediating of an AP.

Incidentally, hereinafter, a device which cannot selectively operate in one status of the three statuses (that is, the G/O status, the client status, and the device status) defined in the above-described WFD specification but can perform wireless communication through an AP (that is, normal Wi-Fi communication to be described below) will be referred to as a "non-WFD-compliant device". The "non-WFD-compliant device" may also be referred to as a "legacy device". The device being in the G/O status can describe the ID information of a non-WFD-compliant device in the management list. In this case, a non-WFD-compliant device can join the WFD network as a client device. In the present example, the portable device 50 is a non-WFD-compliant device (that is, a legacy device). Therefore, in a case where the MFP 10 is in the G/O status, the MFP 10 can perform WFD communication of target data with the portable device 50.

(Normal Wi-Fi Communication)

A normal Wi-Fi mode is a wireless communication mode which was determined by Wi-Fi Alliance and is different from the WFD mode. Similarly to the WFD mode, the normal Wi-Fi mode is a wireless communication mode for performing wireless communication according to the IEEE 802.11 standard by IEEE, and the standards based on the IEEE 802.11 standard (for example, 802.11a, 802.11b, 802.11g, 802.11n, etc.). However, as described above, the WFD mode is a wireless communication mode for performing wireless communication without intermediating of an AP. On the other hand, the normal Wi-Fi mode is a wireless communication mode for performing wireless communication through an AP. In this point, the WFD mode and the normal Wi-Fi mode are different from each other.

The MFP 10 can join a normal Wi-Fi network and perform normal Wi-Fi communication of target data with any other device on the corresponding normal Wi-Fi network, through an AP. In the present example, since the portable device 50 is a non-WFD-compliant device (that is, a legacy device), it can perform normal Wi-Fi communication. Therefore, the MFP 10 can perform normal Wi-Fi communication of target data with the portable device 50 through any one AP of the plurality of APs 4a and 4b.

In the present example, as an authentication scheme for normal Wi-Fi communication, any one of Open, WPA (which is an abbreviation for Wi-Fi Protected Access) and WPA2 may be used. In these three authentication schemes, the "Open" is an authentication scheme having the lowest security, the "WPA" is an authentication scheme having security higher than that of the "Open", and the "WPA2" is an authentication scheme having security higher than that of the "WPA". In the "Open", authentication using a password is not performed. In contrast, in the "WPA" and the "WPA2", authentication using a password is performed.

In the present example, as an encryption scheme for normal Wi-Fi communication, WEP (which is an abbreviation for Wired Equivalent Privacy), TKIP (which is an abbreviation for Temporal Key Integrity Protocol), or AES (which is an abbreviation for Advanced Encryption Standard) may be used. In these three encryption schemes, the "WEP" is an encryption scheme having the lowest security, the "TKIP" is an encryption scheme having security higher than that of "WEP", and the "AES" is an encryption scheme having security higher than that of the "TKIP".

A normal Wi-Fi network is a wireless network which is established in an environment in which it is possible to install an AP, like a company LAN, a home LAN, or the like, and generally is a wireless network which needs to be steadily formed. On the other hand, a WFD network is, for example, a wireless network which is established to perform temporary wireless communication between one pair of WFD-compliant devices since any AP is not necessary, and generally is a wireless network which needs to be temporarily formed. Like this, in the present example, a situation where a normal Wi-Fi network is a wireless network which needs to be steadily formed, and a WFD network is a wireless network which needs to be temporarily formed is assumed.

(Configuration of MFP 10)

The MFP 10 is configured to perform multiple functions including a printing function and a scanning function. As shown in FIG. 1, the MFP 10 includes an operation unit 12, a display unit 14, a printing unit 16, a scanning unit 18, a wireless LAN interface (hereinafter, the term "interface" will be referred to I/F) 20, an NFC I/F 22, and a control unit 30. These components 12 to 30 are connected to a bus line (with no reference symbol).

The operation unit 12 has a plurality of keys. A user can operate the operation unit 12 and input various instructions to the MFP 10. The display unit 14 is configured to display a variety of information. The printing unit 16 is a printing mechanism such as an inkjet type mechanism or a laser type mechanism. The scanning unit 18 is a scanning mechanism such a CCD or a CIS.

The wireless LAN I/F 20 is an interface configured to perform WFD communication and normal Wi-Fi communication. The wireless LAN I/F 20 is physically one interface (that is, one IC chip). However, to the wireless LAN I/F 20, both of a MAC address usable for WFD communication (hereinafter, referred to as an MAC address for WFD), and a MAC address usable for normal Wi-Fi communication (hereinafter, referred to as a MAC address for normal Wi-Fi) are assigned. Specifically, to the wireless LAN I/F 20, the MAC address for normal Wi-Fi is assigned in advance. The control unit 30 uses the MAC address for normal Wi-Fi to generate the MAC address for WFD, which is different from the MAC address for normal Wi-Fi, and assigns the MAC address for WFD to the wireless LAN I/F 20. Therefore, the control unit 30 can simultaneously perform both of normal Wi-Fi communication using the MAC address for normal Wi-Fi, and WFD communication using the MAC address for WFD. That is, the MFP 10 can join both of a WFD network and a normal Wi-Fi network at the same time.

In terms of the MAC addresses usable by the MFP 10, WFD communication and normal Wi-Fi communication can be expressed, for example, as follow. That is, WFD communication is wireless communication in which the MAC address for WFD of the MFP 10 is used, and normal Wi-Fi communication is wireless communication in which the MAC address for normal Wi-Fi of the MFP 10 is used. Also, a WFD network is a wireless network in which the MAC address for WFD of the MFP 10 is used, and a normal Wi-Fi network is wireless network in which the MAC address for normal Wi-Fi of the MFP 10 is used.

The NFC I/F 22 is an interface configured to perform NFC communication. A chip configuring the NFC I/F 22, and the chip configuring the wireless LAN I/F 20 are physically different from each other.

The communication rate of wireless communication through the wireless LAN I/F 20 (the maximum rate of this communication is, for example, 11 Mbps to 600 Mbps) is higher than the communication rate of wireless communication through the NFC I/F 22 (the maximum rate of this communication is, for example, 100 Kbps to 424 Kbps). Further, the frequencies of carrier waves of wireless communication through the wireless LAN I/F 20 (for example, a band of 2.4 GHz or 5.0 GHz) are different from the frequencies of carrier waves of wireless communication through the NFC I/F 22 (for example, a band of 13.56 MHz). Also, for example, in a case where the distance between the MFP 10 and the portable device 50 is equal to or less than about 10 cm, the control unit 30 can perform NFC communication with the portable device 50 through the NFC I/F 22. Meanwhile, not only in a case where the distance between the MFP 10 and the portable device 50 is equal to or less than about 10 cm, but also in a case where the distance between the MFP 10 and the portable device 50 is equal to or larger than about 10 cm (the maximum of the distance is, for example, about 100 m), the control unit 30 can perform WFD communication and normal Wi-Fi communication with the portable device 50 through the wireless LAN I/F 20. That is, a maximum distance within which the MFP 10 can perform wireless communication with a communication destination device (for example, the portable device 50) through the wireless LAN I/F 20 is larger than a maximum distance within which the MFP 10 can perform wireless communication with a communication destination device through the NFC I/F 22.

The control unit 30 includes a CPU 32 and a memory 34. The CPU 32 is configured to perform various processes according to programs stored in the memory 34. The CPU 32 can perform processes according to programs to implement the functions of the above-described components 41 to 46. The memory 34 is configured by a ROM, a RAM, a hard disk, and so on. The memory 34 is configured to store the above-described programs which can be executed by the CPU 32.

The memory 34 is further configured to store a WFD status value indicating the current status of the MFP 10 relative to the WFD (that is, any one status of the G/O status, the client status, and the device status). In a case where the MFP 10 belongs to a WFD network (that is, a case where the WFD status value represents the G/O status or the client status), the memory 34 further stores WFD wireless settings for performing WFD communication.

The WFD wireless settings include authentication scheme information, encryption scheme information, a password, a service set identifier (SSID) and a basic service set identifier (BSSID). The SSID which is included in the WFD wireless settings is a network identifier for identifying a WFD network. The BSSID which is included in the WFD wireless settings is a unique identifier assigned to a G/O device of the WFD network (for example, the MAC address of the G/O device).

In general, when forming a WFD network, a G/O device prepares WFD wireless settings, and supplies the corresponding WFD wireless settings to each client device. For example, when the MFP 10 operates in the G/O status, and forms a WFD network, the control unit 30 of the MFP 10 prepares WFD wireless settings. Specifically, the control unit 30 prepares predetermined authentication scheme information (that is, "WPA2") and predetermined encryption scheme information (that is "AES"). The control unit 30 prepares a predetermined password, or prepares a password by newly generating the password. The control unit 30 prepares a predetermined SSID or newly generates an SSID, so as to prepare the SSID. Also, the control unit 30 prepares a predetermined MAC address for WFD, as a BSSID.

Therefore, in a case where the MFP 10 operates in the G/O status and belongs to a WFD network, the memory 34 stores WFD wireless settings prepared by the MFP 10 when the MFP 10 formed the corresponding WFD network. Meanwhile, in a case where the MFP 10 operates in the client status and belongs to a WFD network, the memory 34 stores WFD wireless settings prepared by a G/O device that is different from the MFP 10 (that is, WFD wireless settings obtained from the corresponding G/O device) when the corresponding G/O device formed the corresponding WFD network.

Further, in a case where the MFP 10 belongs to a normal Wi-Fi network, the memory 34 further stores normal Wi-Fi wireless settings for performing normal Wi-Fi communication. The normal Wi-Fi wireless settings generally include authentication scheme information, encryption scheme information, an SSID, a BSSID, and a password. The SSID which is included in the normal Wi-Fi wireless settings is a network identifier for identifying the normal Wi-Fi network. The BSSID which is included in the normal Wi-Fi wireless setting information is a unique identifier assigned to an AP forming the normal Wi-Fi network (for example, the MAC address of the AP).

As a method which is used for the MFP 10 to join a normal Wi-Fi network, there are a first method in which the user of the MFP 10 gives predetermined operation to the operation unit 12, and a second method of performing STEPS S42 to S48 of FIG. 3 to be described below.

In the first method, when the predetermined operation is given to the operation unit 12, the MFP 10 performs SSID searching. As a result, from each of the APs 4a and 4b existing around the MFP 10, the MFP 10 obtains authentication scheme information representing an authentication scheme which is being used currently by the corresponding AP, encryption scheme information representing an encryption scheme which is being used currently by the corresponding AP, and an SSID and a BSSID which are being used currently by the corresponding AP. Next, the MFP 10 performs control such that the display unit 14 displays a plurality of SSIDs obtained from the plurality of APs. The user uses the operation unit 12 to select one SSID (that is, one AP) from the plurality of SSIDs.

As described above, in a high-security normal Wi-Fi using the authentication scheme "WPA" or "WPA2", authentication using a password is performed. Therefore, in a case where the selected AP is using the authentication scheme "WPA" or "WPA2", the user also uses the operation unit 12 to input a password. The MFP 10 uses not only the authentication scheme information, the encryption scheme information, the SSID, and the BSSID obtained from the selected AP, but also the password input by the user, to perform wireless connection with the selected AP. The wireless connection includes a communication process necessary for the MFP 10 to join a normal Wi-Fi network (for example, a communication process for authentication such as communication of an authentication signal, an association request signal, and an association response signal). In this way, the MFP 10 joins the normal Wi-Fi network which the selected AP forms.

Meanwhile, in a low-security normal Wi-Fi network using the authentication scheme "Open", authentication using a password is not performed. Therefore, in a case where the selected AP is using the authentication scheme "Open", the user does not input any password. The MFP 10 uses the authentication scheme information, the encryption scheme information, the SSID, and the BSSID obtained from the selected AP, to perform wireless connection with the selected AP, so as to join the normal Wi-Fi network which the selected AP forms. The memory 34 stores each piece of information (such as the authentication scheme information) used for the wireless connection with the selected AP, as a normal Wi-Fi wireless setting.

Whenever the MFP joins a normal Wi-Fi network by the above-described method, the memory 34 stores a participation information item, in association with an SSID for identifying the corresponding normal Wi-Fi network, and a password being used in the corresponding normal Wi-Fi network. That is, the memory 34 cumulatively stores one or more participation information items corresponding to one ore more normal Wi-Fi networks which the MFP 10 has participated in. Also, as described above, in a normal Wi-Fi network using the authentication scheme "Open", any password is not used. Therefore, a participation information item corresponding to that normal Wi-Fi network includes an SSID but does not include any password.

Even in the above-described second method, in STEP S42 of FIG. 3, the MFP 10 performs SSID searching, which will be described in detail below. Next, in STEP S44, the MFP 10 automatically selects one SSID (that is, one AP) without receiving any user's instruction. Subsequently, in STEP S48, the MFP 10 performs wireless connection with the selected AP. In this way, the MFP 10 automatically joins the normal Wi-Fi network which the selected AP forms.

(Configuration of Portable Device 50)

The portable device 50 is, for example, a portable terminal device such as a mobile phone (for example, a smart phone), a PDA, a notebook PC, a tablet PC, a portable audio player, or a portable video player. The portable device 50 can perform NFC communication and normal Wi-Fi communication.

The portable device 50 includes an operation unit 52, a display unit 54, a wireless LAN I/F 60, an NFC I/F 62, and a control unit 70. These components 52 to 70 are connected to a bus line (with no reference symbol). The operation unit 52 has a plurality of keys. A user can operate the operation unit 52 to input various instructions to the portable device 50. The display unit 54 is configured to display a variety of information.

The wireless LAN I/F 60 is an interface for performing normal Wi-Fi communication. The NFC I/F 62 is an interface for performing NFC communication. A difference between these interfaces 60 and 62 is the same as the difference between the interfaces 20 and 22 of the MFP 10. That is, for example, the communication rate of wireless communication through the wireless LAN I/F 60 is higher than the communication rate of wireless communication through the NFC I/F 62.

The control unit 70 includes a CPU 72 and a memory 74. The CPU 72 is configured to perform various processes according to programs stored in the memory 74. Programs stored in the memory 74 include an application 76 for performing control such that the MFP 10 performs various functions (such as the printing function and the scanning function). For example, the application 76 may be installed from a server provided by the vender of the MFP 10, into the portable device 50, or may be installed from a medium shipped with the MFP 10, into the portable device 50. The CPU 72 can perform processes according to the application 76 to implement the functions of those components 81 to 86. Also, the components 81 to 86 function in Examples 4 to 6 to be described below.

(Configurations of APs 4a and 4b)

Each of the APs 4a and 4b is not a G/O device of WFD, but a normal AP called a wireless access point or a wireless LAN router. Each of the APs 4a and 4b forms a normal Wi-Fi network. Each of the APs 4a and 4b receives target data from one device (for example, the portable device 50) of a plurality of devices belonging to the normal Wi-Fi network, and transmits the corresponding target data to a second device (for example, the MFP 10) of the above-described plurality of devices. That is, each of the APs 4a and 4b functions as a relaying device that relays wireless communication of target data between one pair of devices belonging to the normal Wi-Fi network.

Incidentally, a difference between a G/O device of WFD and normal APs (that is, the APs 4a or 4b) is as follows. That is, a G/O device of WFD can operate in a status (that is, the client status) which is different from the G/O status in a case where the corresponding device pulls out of a WFD network and newly joins another WFD network. On the other hand, each normal AP performs a function of relaying wireless communication between one pair of devices even if the corresponding AP forms a normal Wi-Fi network. That is, normal APs can perform only the same operation as that in the G/O status of WFD, but cannot perform the same operation as that in the client status of WFD.

Figure 2:
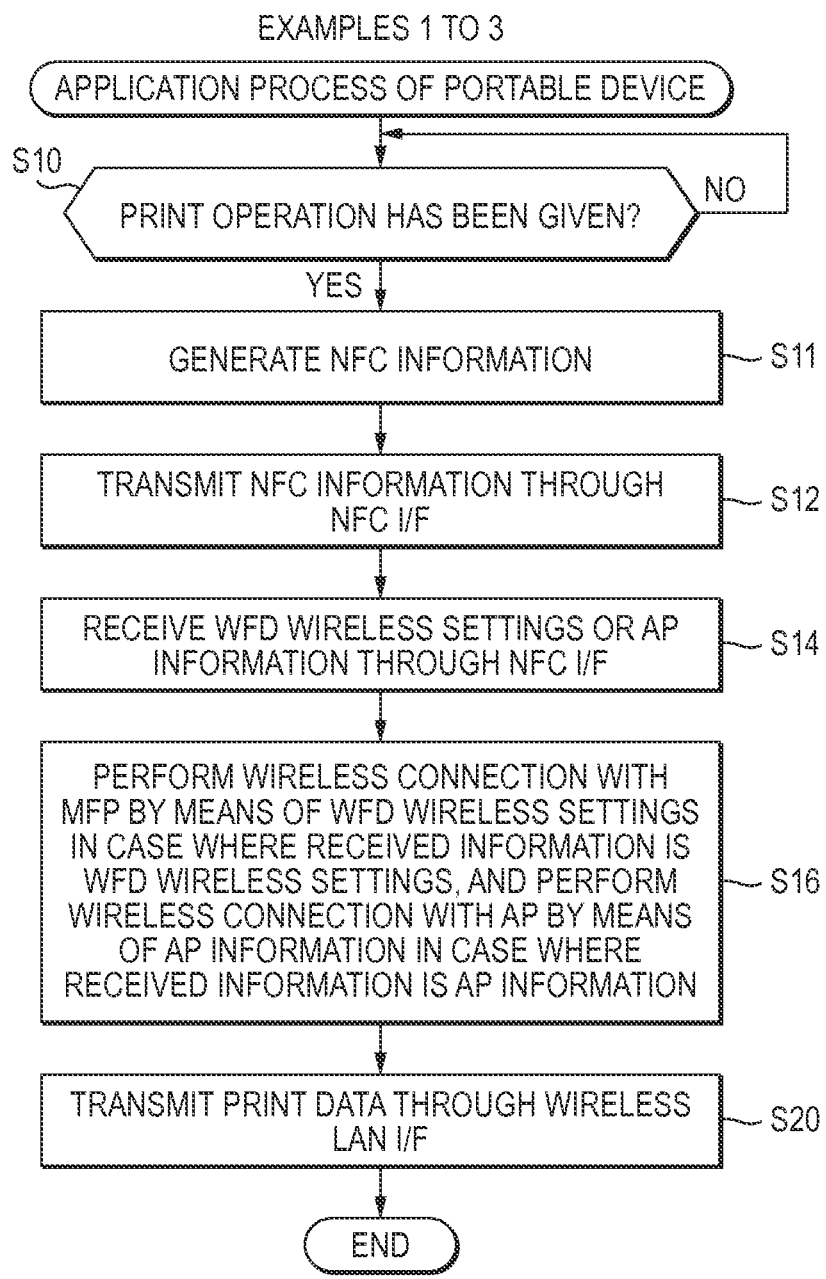
FIG. 2 illustrates a flow chart of an application process of a portable device.

(Application Process of Portable Device 50 Shown in FIG. 2)

Subsequently, referring to FIG. 2, contents of processes which the control unit 70 of the portable device 50 performs according to the application 76 will be described. In a case where the user of the portable device 50 wants to perform control such that the MFP 10 prints images represented by print target data (hereinafter, referred to as "print data") stored in the portable device 50, the user operates the operation unit 52 and activates the application 76. As a result, the control unit 70 starts a flow chart of FIG. 2 according to the application 76.

The user gives print operation, which includes operation for selecting print data stored in the memory 74 of the portable device 50 and operation for determining whether to set a password to the print data, to the operation unit 52. In this case, the control unit 70 determines "YES" in STEP S10, and proceeds to STEP S11.

Incidentally, in a case where a password is set to the print data, unless the user operates the operation unit 12 of the MFP 10 and inputs the corresponding password to the MFP 10, the MFP 10 does not start printing according to the print data. That is, only the user having given the print operation can acquire a printed matter which is generated by printing of the MFP 10. On the other hand, in a case where any password is not set to the print data, the MFP 10 immediately starts printing upon receiving the print data (that is, even if any password is not input to the MFP 10, the MFP 10 starts printing). That is, any person other than the user having given the print operation to the portable device 50 can take the printed matter. Therefore, in the case where a password is set to the print data, the security of the print data is higher than that in the case where any password is not set to the print data.

In STEP S11, first, the control unit 70 generates NFC information including: a print command for instructing the MFP 10 to perform the printing function; and security information representing the security of the print data. The NFC information does not include the print data. Also, in a case where the user determines to set a password to the print data, the control unit 70 generates security information representing secureness. In this case, the security information further includes the password set to the print data. Meanwhile, in a case where the user determines not to set any password to the print data, the control unit 70 generates security information representing insecureness. In this case, the security information includes no password.

While the power of the MFP 10 is on, the NFC I/F 22 of the MFP 10 transmits a detection radio wave for detecting a device (that is, the portable device 50) which is capable of performing NFC communication. After making the above-described print operation, the user of the portable device 50 brings the portable device 50 close to the MFP 10. Then, the distance between the portable device 50 and the MFP 10 becomes smaller than a distance (for example, 10 cm) within which their radio waves reach each other. In this case, the portable device 50 receives the detection radio wave from the MFP 10 and transmits a response radio wave to the MFP 10. As a result, an NFC session is established between the MFP 10 and the portable device 50. In STEP S12, the control unit 70 uses the NFC session to transmit the generated NFC information to the MFP 10 through the NFC I/F 62.

When the NFC information is transmitted from the portable device 50 to the MFP 10, the MFP 10 determines "YES" in STEP S30 of FIG. 3 to be described below, and performs processes of STEP S32 and the subsequent STEPS. As a result, the MFP 10 uses the NFC session to transmit WFD wireless settings (in STEP S40 of FIG. 3) or AP information (in STEP S46 of FIG. 3) to the portable device 50. The WFD wireless settings include a variety of information (that is, authentication scheme information, encryption scheme information, an SSID, a BSSID, and a password) being used currently in the WFD network which the MFP 10 being in the G/O status forms. The AP information includes a variety of information (that is, authentication scheme information, encryption scheme information, an SSID, and a BSSID) being used currently in a normal Wi-Fi network which an AP forms. Incidentally, in a case where authentication using a password is performed in the corresponding normal Wi-Fi network, that is, in a case where an authentication scheme being used currently in the corresponding normal Wi-Fi network is "WPA" or "WPA2", the AP information further includes a password being used currently in the corresponding normal Wi-Fi network. Meanwhile, in a case where authentication using a password is not performed in the corresponding normal Wi-Fi network, that is, in a case where the authentication scheme being used currently in the corresponding normal Wi-Fi network is "Open", the AP information includes no password.

In STEP S14 of FIG. 2, the control unit 70 of the portable device 50 receives the WFD wireless settings or the AP information from the MFP 10 through the NFC I/F 62. After receiving the WFD wireless settings or the AP information in STEP S14, the control unit 70 performs control such that, for example, a predetermined tone is output from the portable device 50 for notifying the user of the portable device 50 that the NFC communication has terminated. Therefore, the user can recognize that it is possible to keep the portable device 50 away from the MFP 10. When STEP S14 terminates, the control unit 70 proceeds to STEP S16.

In STEP S16, the control unit 70 performs wireless connection according to the information received in STEP S14. In a case where the information received in STEP S14 is the WFD wireless settings, the control unit 70 uses the received WFD wireless settings to perform wireless connection with the MFP 10 being in the G/O status, through the wireless LAN I/F 60. The corresponding wireless connection includes a communication process (for example, a communication process for authentication) for joining a specific WFD network which the MFP 10 being in the G/O status forms. Therefore, the portable device 50 can participate as a client device in the above-described specific WFD network. As a result, the MFP 10 and the portable device 50 belong to the same WFD network.

Meanwhile, in a case where the information received in STEP S14 is the AP information, the control unit 70 uses the received AP information to perform wireless connection with an AP through the wireless LAN I/F 60. The corresponding wireless connection includes a communication process (for example, a communication process for authentication) for joining a specific normal Wi-Fi network identified by the SSID included in the received AP information. Therefore, the portable device 50 can participate in the above-described specific normal Wi-Fi network. As a result, the MFP 10 and the portable device 50 belong to the same normal Wi-Fi network.

Also, in a case where the portable device 50 already belongs to a WFD network or a normal Wi-Fi network when STEP S16 is performed, in STEP S16, the control unit 70 pulls out of the existing network and joins the above-described specific WFD network or specific normal Wi-Fi network. Further, in the case of pulling out of the above-described existing network, the control unit 70 stores wireless settings (for example, an SSID, a password, and so on) for re-joining the above-described existing network, in the memory 74.

When STEP S16 terminates, in STEP S20, the control unit 70 transmits the print data to the MFP 10 through the wireless LAN I/F 60. For example, in a case where the portable device 50 participates in the above-described specific WFD network, in STEP S20, the control unit 70 uses the above-described specific WFD network to transmit the print data to the MFP 10 being in the G/O status. That is, even if a relaying device (for example, the AP 4a or 4b) does not relay the print data, the print data is directly transmitted from the portable device 50 to the MFP 10. Also, for example, in a case where the portable device 50 participates in the above-described specific normal Wi-Fi network, in STEP S20, the control unit 70 uses the above-described specific normal Wi-Fi network to transmit the print data to the MFP 10 through the AP (for example, 4a).

When STEP S20 terminates, the application process of FIG. 2 terminates. Also, in the case where the portable device 50 pulled out of the existing network in STEP S16, when STEP S20 terminates, the control unit 70 pulls out of the new network which the control unit 70 joined in STEP S16 and joins the original network again by using the wireless settings stored in the memory 74 in STEP S16. Meanwhile, in a case where the portable device 50 did not pull out of the existing network in STEP S16, even if STEP S20 terminates, the control unit 70 maintains the state where the portable device 50 participates in the above-described new network.

Figure 3:
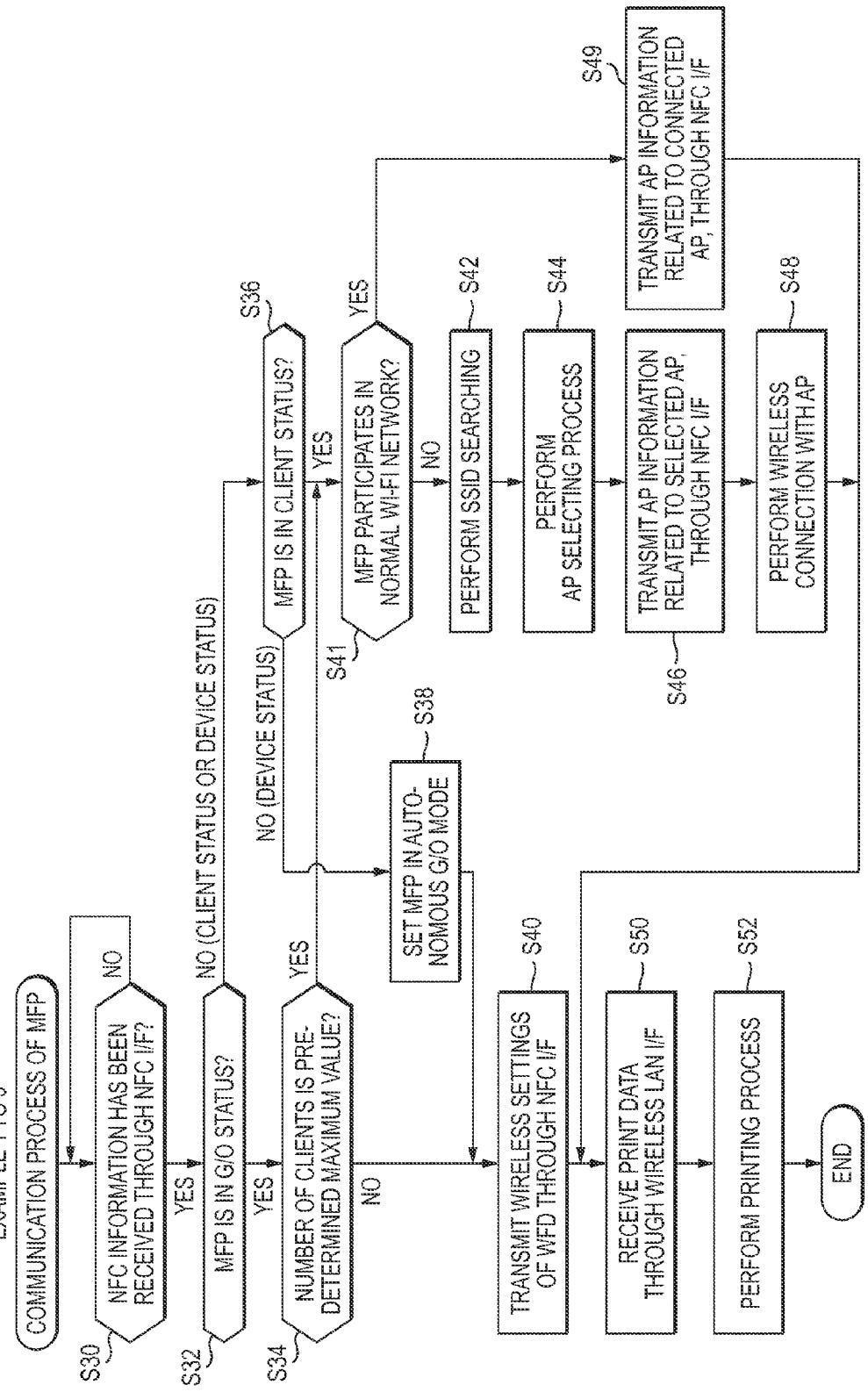
FIG. 3 illustrates a flow chart of a communication process of a multi-function peripheral (MFP)

(Communication Process of MFP 10 Shown in FIG. 3)

Subsequently, contents of processes which the control unit 30 of the MFP 10 performs will be described with reference to FIG. 3. As described above, in STEP S12 of FIG. 2, the NFC information is transmitted from the portable device 50 to the MFP 10. A receiving unit 41 of the MFP 10 receives the NFC information from the portable device 50 through the NFC I/F 22. In this case, the receiving unit 41 determines "YES" in STEP S30 of FIG. 3, and the communication process proceeds to STEP S32.

In STEP S32, a first determining unit 47 determines whether the current status of the MFP 10 is the G/O status (that is, whether the MFP 10 operates in the G/O status and belongs to a WFD network). In a case where the WFD status value stored in the memory 34 represents the G/O status, the first determining unit 47 determines "YES" in STEP S32, and the communication process proceeds to STEP S34. Meanwhile, in a case where the WFD status value stored in the memory 34 represents the client status or the device status, the first determining unit 47 determines "NO" in STEP S32, and the communication process proceeds to STEP S36.

In STEP S34, the first determining unit 47 determines whether the number of client devices belonging to the WFD network which the MFP 10 being in the G/O status forms is equal to a predetermined maximum value N. Here, N may be 1, or an integer equal to or larger than 2. In a case where the number of client devices is equal to the maximum value N, the first determining unit 47 determines "YES" in STEP S34, and the communication process proceeds to STEP S41. Meanwhile, in a case where the number of client devices is less than the maximum value, the first determining unit 47 determines "NO" in STEP S34, and the communication process proceeds to STEP S40.

In STEP S36, the first determining unit 47 determines whether the current status of the MFP 10 is the client status (that is, whether the MFP 10 operates in the client status and belongs to the WFD network). In a case where the WFD status value stored in the memory 34 represents the client status, the first determining unit 47 determines "YES" in STEP S36, and the communication process proceeds to STEP S41. Meanwhile, in a case where the WFD status value stored in the memory 34 represents the device status, that is, a case where the MFP 10 does not belong to the WFD network, the first determining unit 47 determines "NO" in STEP S36, and the communication process proceeds to STEP S38.

In STEP S38, a forming unit 49 switches the MFP 10 to an autonomous G/O mode. As described above, when a WFD network is to be newly formed, in general, G/O negotiation is performed, whereby a G/O device and client devices are determined. On the other hand, in the autonomous G/O mode, the MFP 10 is determined to be the G/O status, without performing G/O negotiation. In the stage of STEP S38, the MFP 10 is a G/O device, and there is no client device. That is, the forming unit 49 forms a WFD network which only the G/O device (that is, the MFP 10) belongs to. The autonomous G/O mode is a mode to keep the MFP 10 operating in the G/O status. For example, in a case where the MFP 10 becomes the G/O status in G/O negotiation and forms a WFD network, if client devices disappear from the corresponding WFD network, the MFP 10 transitions from the G/O status to the device status (that is, the WFD network disappears). On the other hand, for example, in a case where the MFP 10 becomes the G/O status in the autonomous G/O mode and forms a WFD network, even if client devices disappear, the MFP 10 maintains the G/O status (that is, the MFP maintains the WFD network).

In STEP S38, the forming unit 49 prepares WFD wireless settings which need to be used in the WFD network (that is, authentication scheme information, encryption scheme information, an SSID, a BSSID, and a password). A method by which the forming unit 49 prepares WFD wireless settings is as described above. In STEP S38, furthermore, the forming unit 49 stores a WFD status value, which represents the G/O status, and the prepared WFD wireless settings, in the memory 34. When STEP S38 terminates, the communication process proceeds to STEP S40.

In STEP S40, a transmitting unit 42 transmits the WFD wireless settings, which are stored in the memory 34, to the portable device 50 through the NFC I/F 22. As described above, the process of STEP S40 is performed in a case of "NO" in STEP S34, or in a case of "NO" in STEP S36 (that is, a case of passing through STEP S38). In the case of "NO" in STEP S34, the number of client devices belonging to the WFD network which the MFP 10 being in the G/O status forms is less than the maximum value. Therefore, it is possible to perform control such that the portable device 50 joins the WFD network as a client device. Also, in the case of "NO" in STEP S36, in STEP S38, a WFD network which only the MFP 10 being in the G/O status belongs to is formed. Therefore, it is possible to perform control such that the portable device 50 joins the WFD network as a client device. In STEP S40, in order to perform control such that the portable device 50 joins the WFD network as a client device, the WFD wireless settings are transmitted from the MFP 10 to the portable device 50. When STEP S40 terminates, the communication process proceeds to STEP S50.

Meanwhile, in a case of "YES" in STEP S34, or in a case of "YES" in STEP S36, STEP S41 is performed. In STEP S41, a second determining unit 48 determines whether the MFP 10 participates in a normal Wi-Fi network currently. In a case where there are normal Wi-Fi wireless settings stored in the memory 34, the second determining unit 48 determines "YES" in STEP S41, and the communication process proceeds to STEP S49. Meanwhile, in a case where there are no normal Wi-Fi wireless settings stored in the memory 34, the second determining unit 48 determines "NO", and the communication process proceeds to STEP S42.

In STEP S49, the transmitting unit 42 prepares AP information related to an AP included in the normal Wi-Fi network which the MFP 10 belongs to currently (that is, an AP having established wireless connection with the MFP 10). Specifically, the transmitting unit 42 prepares AP information including the normal Wi-Fi wireless settings stored in the memory 34. Subsequently, the transmitting unit 42 transmits the prepared AP information to the portable device 50 through the NFC I/F 22. Therefore, the portable device 50 joins the normal Wi-Fi network by means of the AP information in STEP S16 of FIG. 2. As a result, the MFP 10 and the portable device 50 belong to the same normal Wi-Fi network. When STEP S49 terminates, the communication process proceeds to STEP S50.

Meanwhile, in a case of "NO" in STEP S41, the processes of STEPS S42 to S48 are performed. In the case of "YES" in STEP S34, the number of client devices belonging to the WFD network which the MFP 10 being in the G/O status forms is equal to the maximum value N. Therefore, it is impossible to perform control such that the portable device 50 joins the WFD network as a client device. Also, in the case of "YES" in STEP S36, the MFP 10 being in the client device belongs to a WFD network which another device being in the G/O status forms. In this case, the MFP 10 does not have authority to perform control such that another device (that is, the portable device 50) joins the corresponding WFD network. Therefore, it is impossible to perform control such that the portable device 50 joins the WFD network as a client device. Further, in the case of "NO" in STEP S41, the MFP 10 does not participate in any normal Wi-Fi network currently. For this reason, the MFP 10 cannot perform control such that the portable device 50 joins a normal Wi-Fi network which the MFP 10 participates in currently. Therefore in STEPS S42 to S48, the control unit 30 performs processes such that the MFP 10 and the portable device 50 join the same normal Wi-Fi network.

As described above, in the present example, if it is possible to perform control such that the portable device 50 joins the WFD network ("NO" in STEP S34, or "NO" in STEP S36), in STEP S40, the process for joining the portable device 50 into a WFD network is performed. Therefore, it is possible to plug the portable device 50 to a WFD network which is to be temporarily formed. In this case, since the normal Wi-Fi wireless settings are not transmitted to the portable device 50, it is possible to suppress a reduction in the security of a normal Wi-Fi network which is to be steadily formed. In view of these circumstances, in the present example, first, in STEPS S32 to S40, the portable device 50 is first plugged into a WFD network. If this is impossible, in STEPS S41 to S49, the portable device 50 is joined to a normal Wi-Fi network.

In STEP S42, a communication obtaining unit 44 performs SSID searching so as to search for an AP existing around the MFP 10. Since the communication obtaining unit searches for an AP as described above, the communication obtaining unit 44 may also be referred to as a searching unit. The communication obtaining unit 44 transmits a PReq signal through the wireless LAN I/F 20. Upon receiving the PReq signal from the MFP 10, each of the AP 4a and 4b existing around the MFP 10 transmits a PRes signal to the MFP 10. The communication obtaining unit 44 receives the PRes signal from each of the AP 4a and 4b through the wireless LAN I/F 20. That is, in the present example, the communication obtaining unit 44 can find two AP 4a and 4b by the SSID searching.

Incidentally, if there is any G/O device around the MFP 10, in a case where the corresponding G/O device receives a PReq signal from the MFP 10, the corresponding G/O device also transmits a PRes signal to the MFP 10. Therefore, the communication obtaining unit 44 can receive PRes signals from not only the AP 4a and 4b but also the G/O device. However, in the present example, the following description will be made on an example in which there is no G/O device around the MFP 10.

A PRes signal includes an SSID being used currently by a corresponding AP, authentication scheme information representing an authentication scheme being used currently by the corresponding AP, encryption scheme information representing an encryption scheme being used currently by the corresponding AP, and communication rate information representing the communication rate of wireless communication which the corresponding AP realizes. Therefore, the communication obtaining unit 44 obtains information related to wireless communication using an AP by receiving a PRes signal from the corresponding AP.

In STEP S44, a selecting unit 43 selects one AP from the plurality of AP 4a and 4b. As described above, the memory 34 has stored one or more participation information items corresponding to one or more normal Wi-Fi networks which the MFP 10 has participated in. From a plurality of SSIDs included in the plurality of PRes signals obtained in STEP S42, the selecting unit 43 extracts one or more SSIDs matched with one or more SSIDs included in one or more participation information items stored in the memory 34. Next, the selecting unit 43 selects one SSID from the extracted one or more SSIDs, so as to select one AP. A specific method for selecting one AP will be described below in detail.

In STEP S46, the transmitting unit 42 first prepares AP information related to the selected AP. Specifically, the transmitting unit 42 prepares the authentication scheme information, the encryption scheme information, the SSID, and the BSSID obtained from the selected AP in the SSID searching of STEP S42. Also, the transmitting unit 42 reads a participation information item including the SSID obtained from the selected AP, from the memory 34, and in a case where the corresponding participation information item includes a password, the transmitting unit 42 prepares the corresponding password. Then, the transmitting unit 42 transmits AP information including the prepared information items, to the portable device 50 through the NFC I/F 22.

In STEP S48, a communicating unit 46 uses the individual information items prepared in STEP S46, to perform wireless connection with the selected AP through the wireless LAN I/F 20. The corresponding wireless connection includes a communication process for joining a specific normal Wi-Fi network identified by the SSID prepared in STEP S46. In this way, the MFP 10 can join the above-described specific normal Wi-Fi network. As described above, the portable device 50 joins the above-described specific normal Wi-Fi network in STEP S16 of FIG. 2. As a result, the MFP 10 and the portable device 50 belong to the same normal Wi-Fi network. When STEP S48 terminates, the communication process proceeds to STEP S50.

In STEP S50, the communicating unit 46 receives the print data from the portable device 50 through the wireless LAN I/F 20. For example, in STEP S50 which is performed after STEP S40, the communicating unit 46 receives the print data directly from the portable device 50 being in the client status, not through a relaying device. Also, for example, in STEP S50 which is performed after STEP S48 or S49, the communicating unit 46 receives the print data from the portable device 50 through an AP.

Next, in STEP S52, the control unit 30 processes the print data (for example, into data which the printing unit 16 can process) and supplies the processed data to the printing unit 16. Therefore, the printing unit 16 performs printing onto printing media according to the processed data. Also, in a case where the security information included in the NFC information received in STEP S30 represents secureness, until the user inputs the password included in the corresponding security information to the MFP 10, the printing unit 16 does not start printing (that is, the printing unit reserves printing). Meanwhile, in a case where the security information included in the NFC information received in STEP S30 represents insecureness, the printing unit 16 starts printing immediately upon obtaining the processed data from the control unit 30. When STEP S52 terminates, the communication process of FIG. 3 terminates. Also, in a case where the MFP 10 joins a new normal Wi-Fi network in STEP S48, even if STEP S52 terminates, the control unit 30 maintains a state where the MFP 10 participates in the above-described new normal Wi-Fi network.

The print data has a data size larger than that of information (the NFC information, the WFD wireless settings, the AP information, and so on described above) which is communicated by NFC. As described above, the communication rate of NFC is lower than the communication rate of WFD communication or normal Wi-Fi communication. Therefore, if a configuration in which NFC is used to perform wireless communication of print data between the MFP 10 and the portable device 50 is used, it takes a long time to perform wireless communication of the print data. In view of these circumstances, in the present example, the MFP 10 performs STEP S40, S46 or S49 of FIG. 3 and transmits the WFD wireless settings or the AP information to the portable device 50. Therefore, the MFP 10 and the portable device 50 can perform WFD communication or normal Wi-Fi communication of the print data through the wireless LAN I/F 20, and thus can quickly perform wireless communication of the print data.

As described above, in a case where the portable device 50 is in a specific mode for performing direct wireless communication with the MFP 10 without intermediating a relaying device (that is, a mode in which the MFP 10 is in the G/O status and the portable device 50 is in the client status) and can join a WFD network (that is, the case of "NO" in STEP S34 of FIG. 3, or a case where STEP S38 is performed), in STEP S40, the MFP 10 transmits wireless settings, which enables the portable device 50 to join a WFD network, to the portable device 50. Meanwhile, in a case where the portable device 50 cannot join the WFD network when being in the above-described specific mode (that is, the case of "YES" in STEP S34 of FIG. 3, or the case of "YES" in STEP S36), in STEP S46 or S49, the MFP 10 transmits wireless settings, which enables the portable device 50 to join a normal Wi-Fi network, to the portable device 50. Therefore, the MFP 10 can transmit appropriate wireless settings to the portable device 50 according to whether the portable device 50 can join the WFD network when being in the above-described specific mode. Therefore, the MFP 10 can appropriately perform control such that the portable device 50 joins the WFD network or the normal Wi-Fi network. As a result, the MFP 10 can use the WFD network or the normal Wi-Fi network to appropriately perform wireless communication of the print data with the portable device 50 in STEP S50.

Example 1-1

Subsequently, the contents of the AP selecting process of STEP S44 of FIG. 3 will be described. In STEP S44, first, with respect to each of the extracted one or more SSIDs, the selecting unit 43 first checks the encryption scheme being used currently by an AP which is the source of the corresponding SSID (that is, encryption scheme information included in a PRes signal including the corresponding SSID). Then, in the case where the security information included in the NFC information represents secureness, that is, a case where the security information includes a password, the selecting unit 43 determines that the security of the print data is high. In this case, the selecting unit 43 selects one SSID, from which the encryption scheme "AES" has been confirmed, to select one AP. Meanwhile, in a case where the security information included in the NFC information represents insecureness, that is, a case where the security information includes no password, the selecting unit 43 determines that the security of the print data is low. In this case, the selecting unit 43 selects one SSID from which an encryption scheme (for example, "TKIP" or "WEP") other than "AES" has been confirmed, so as to select one AP.

Incidentally, in the case where the security information included in the NFC information represents secureness, if there is no SSID from which "AES" has been confirmed, the selecting unit 43 may select an SSID from which an encryption scheme other than "AES" has been confirmed. In the case where the security information included in the NFC information represents insecureness, if there is no SSID from which an encryption scheme other than "AES" has been confirmed, the selecting unit 43 may select an SSID from which "AES" has been confirmed. That is, in a case where there is no SSID satisfying a condition among the extracted one or more SSIDs, the selecting unit 43 may use a predetermined method (for example, a randomly selecting method) to select an SSID. This point is the same even in the following examples.

Figure 4:
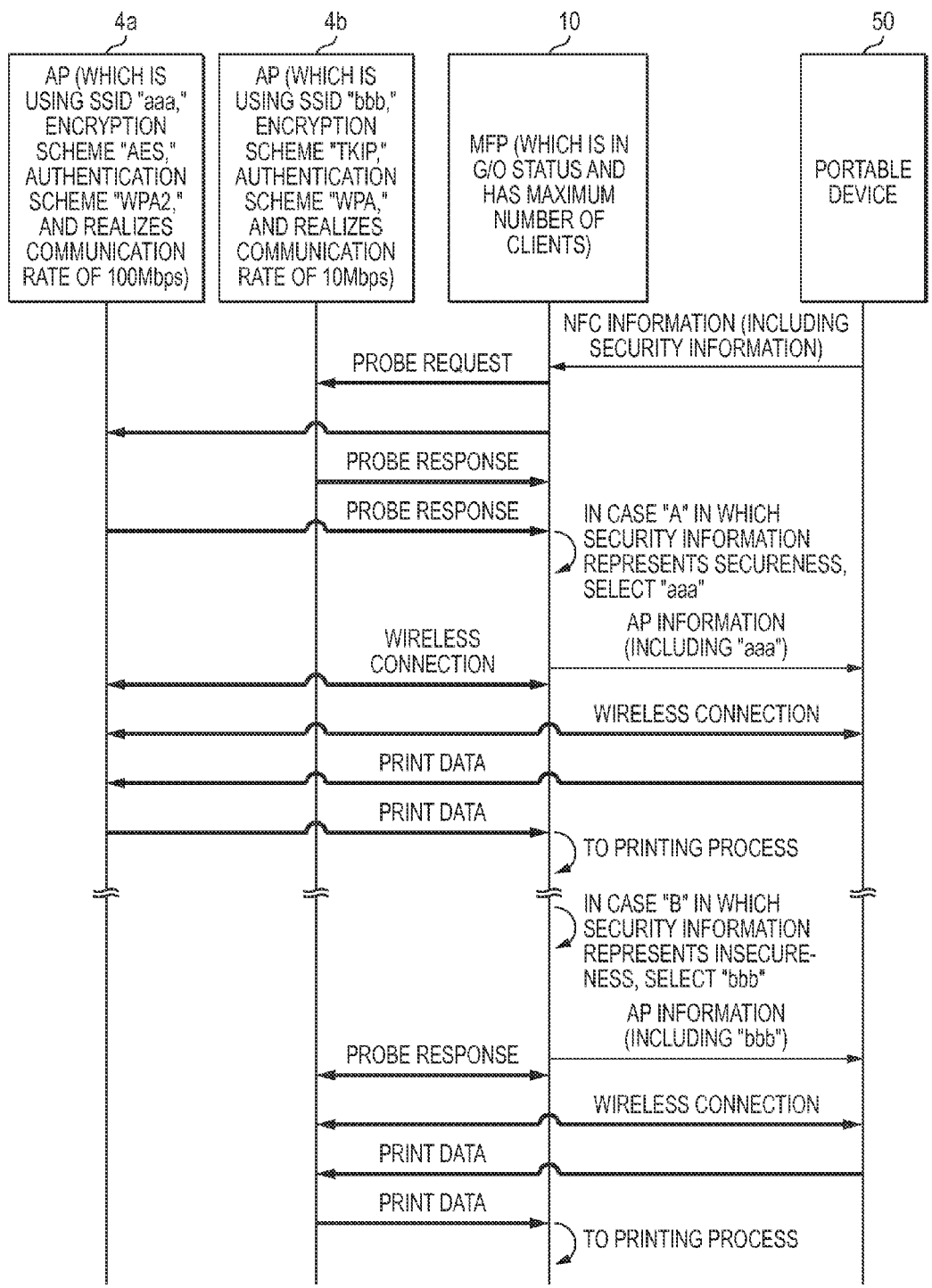
FIG. 4 illustrates a sequence diagram representing communication and processes performed by the MFP and the portable device.

(Specific Example of Example 1-1 Shown in FIG. 4)

Subsequently, a specific example of the Example 1-1 will be described with reference to FIG. 4. In FIG. 4, single-line arrows between the MFP 10 and the portable device 50 represent wireless communication through the NFC I/Fs 22 and 62, and double-line arrows between the MFP 10 and the portable device 50 represent wireless communication through the wireless LAN I/Fs 20 and 60. The AP 4a is using an SSID "aaa", the encryption scheme "AES", and the authentication scheme "WPA2" currently, and realizes a communication rate of 100 Mbps. The AP 4b is using an SSID "bbb", the encryption scheme "TKIP", and the authentication scheme "WPA" currently, and realizes a communication rate of 10 Mbps. Also, BSSIDs being used currently by the AP 4a and 4b are not shown in FIG. 4.

Also, in FIG. 4, the MFP 10 is in the G/O status, and forms a WFD network. However, the MFP 10 has the maximum number N of clients, so that the portable device 50 cannot join the WFD network. Also, the MFP 10 does not participate in any normal Wi-Fi network currently. The MFP 10 has participated in both of a normal Wi-Fi network which the AP 4a forms, and a normal Wi-Fi network which the AP 4b forms. Therefore, the memory 34 of the MFP 10 has stored a participation information item corresponding to the AP 4a, and a participation information item corresponding to the AP 4b.

Upon receiving the NFC information from the portable device 50 through the NFC I/F 22 ("YES" in STEP S30 of FIG. 3), the MFP 10 determines "YES" in STEP S32, "YES" in STEP S34, and "NO" in STEP S41, and performs SSID searching in STEP S42. Then, the MFP 10 receives a PRes signal from each of the AP 4a and 4b.

In CASE "A" of FIG. 4, the security information included in the NFC information represents secureness. Therefore, in STEP S44, the MFP 10 selects the AP 4a being using the encryption scheme "AES" currently, from the plurality of AP 4a and 4b. Next, in STEP S46, the MFP 10 transmits AP information including the SSID "aaa" representing the AP 4a, to the portable device 50 through the NFC I/F 22. Subsequently, in STEP S48, the MFP 10 performs wireless connection with the AP 4a so as to join the normal Wi-Fi network which the AP 4a forms.

Similarly, in STEP S16 of FIG. 2, the portable device 50 also performs wireless connection with the AP 4a so as to join the normal Wi-Fi network which the AP 4a forms. Next, in STEP S20, the portable device 50 transmits the print data to the AP 4a through the wireless LAN I/F 60. The AP 4a transmits the print data to the MFP 10. As a result, the MFP 10 receives the print data through the wireless LAN I/F 20 in STEP S50 of FIG. 3, and performs a printing process in STEP S52.

Meanwhile, in CASE "B" of FIG. 4, the security information included in the NFC information represents insecureness. Therefore, in STEP S44, the MFP 10 selects the AP 4b being using the encryption scheme "TKIP" currently, from the plurality of AP 4a and 4b. Next, in STEP S46, the MFP 10 transmits AP information including the SSID "bbb" representing the AP 4a, to the portable device 50 through the NFC I/F 22. Subsequently, in STEP S48, the MFP 10 performs wireless connection with the AP 4b so as to join the normal Wi-Fi network which the AP 4b forms. Therefore, the MFP 10 receives the print data through the wireless LAN I/F 20 in STEP S50 of FIG. 3, and performs a printing process in STEP S52.

As described above, in the present example, in a case where the user of the portable device 50 sets a password to the print data, that is, a case where the security of the print data is high (which is one example of target data having a first level of security), the selecting unit 43 selects one AP being using the high-security encryption scheme "AES". Therefore, high-security communication of the print data is performed according to the high-security encryption scheme "AES". That is, the MFP 10 can select an appropriate AP according to the intention of the user of the portable device 50 (that is, high security).

Meanwhile, in a case where the user of the portable device 50 does not set any password to the print data, that is, a case where the security of the print data is low (which is one example of target data having a second level of security), the selecting unit 43 selects one AP being using a low-security encryption scheme (for example, "TKIP" or "WEP"). Therefore, low-security communication of the print data is performed according to the low-security encryption scheme. Since the intention of the user of the portable device 50 is low security, even if a low-security encryption scheme is used, there is no problem. If a configuration in which an AP being using the high-security encryption scheme "AES" is necessarily selected regardless of the level of the security of the print data is used, the number of devices which join a normal Wi-Fi network formed by the AP increases, and thus the load of the corresponding AP increases. That is, if a configuration in which an AP being using the high-security encryption scheme "AES" is selected in a situation in which low-security communication of the print data needs to be performed is used, it is feared to disrupt communication of a client device which needs to perform high-security data communication with the corresponding AP. In the present example, in the case where the intention of the user of the portable device 50 is low security, a configuration in which an AP being using a low-security encryption scheme is selected is used. Therefore, it is possible to appropriately suppress occurrence of an event in which only one AP of the plurality of AP 4a and 4b has a large load.

(Correspondence Relation)

The MFP 10 and the portable device 50 are examples of a first communication device and a second communication device, respectively. The NFC I/F 22 and the wireless LAN I/F 20 are examples of a first type of interface and a second type of interface, respectively. The G/O status and the client status are examples of a master status and a slave status, respectively. A WFD network and a normal Wi-Fi network are examples of a first type of wireless network and a second type of wireless network, respectively. The case of "NO" in STEP S34 of FIG. 3, or the case where STEP S38 is performed is an example of a first case. The case of "YES" in STEP S34 of FIG. 3, or the case of "YES" in STEP S36 is an example of a second case. The wireless settings which are transmitted in STEP S40 of FIG. 3, and the wireless settings which are included in AP information to be transmitted in STEP S46 or S49 are examples of first wireless settings and second wireless settings, respectively. The plurality of AP 4a and 4b is an example of a plurality of relaying devices. The print data is an example of target data. A PRes signal is an example of a communication-related information. The security information according to whether any password is set to the print data is an example of data-related information and processing-related information. Also, in the example of FIG. 4, "AES" and "TKIP" are examples of a first encryption scheme and a second encryption scheme.

Example 1-2

Other Examples 1-2 to 1-9 will be described with reference to FIG. 5. Each of Examples 1-2 to 1-9 is different from Example 1-1 in the contents of STEP S44 of FIG. 3.

In Example 1-2, in STEP S44 of FIG. 3, first, with respect to each of the extracted one or more SSIDs, the selecting unit 43 checks an authentication signal being used currently by the source of the corresponding SSID (that is, authentication scheme information included in a PRes signal including the corresponding SSID). Then, in a case where the security information included in the NFC information represents secureness, the selecting unit 43 selects one SSID from which "WPA2" has been confirmed, so as to select one AP (in the example of FIG. 4, the AP 4a which is using "WPA2" currently). Meanwhile, in a case where the security information included in the NFC information represents insecureness, the selecting unit 43 selects one SSID from which an authentication scheme (for example, "WPA" or "Open") other than "WPA2" has been confirmed, so as to select one AP (in the example of FIG. 4, the AP 4b which is using "WPA" currently).

In the present example, communication of the print data having high security (which is one example of target data having a first level of security) is performed according to the high-security authentication scheme "WPA2". That is, the MFP 10 can select an appropriate AP according to the intention of the user of the portable device 50 (that is, high security). Also, in a case where the intention of the user of the portable device 50 is low security, that is, in a case where communication of the print data having low security (which is one example of target data having a second level of security) is performed, the MFP 10 selects an AP being using a low-security authentication scheme. Therefore, it is possible to appropriately suppress occurrence of an event in which only some APs have large loads. Also, in the present example, "WPA2" and "WPA" are examples of a first authentication scheme and a second authentication scheme, respectively.

Example 1-3

In Example 1-1, the user of the portable device 50 gives operation for determining whether to set a password to the print data, to the operation unit 52. Then, according to the corresponding determination, the portable device 50 generates security information. Instead of this, in Example 1-3, the user of the portable device 50 gives operation for determining whether to encrypt the print data, to the operation unit 52.

In a first example, a situation in which the MFP 10 and the portable device 50 have a common key is assumed. In a case where the user determines to encrypt the print data, the control unit 70 of the portable device 50 uses the common key to encrypt the print data, and the control unit 30 of the MFP 10 uses the common key to decrypt the print data. Meanwhile, in a case where the user determines not to encrypt the print data, the control unit 70 of the portable device 50 does not encrypt the print data.

Also, in a second example, a situation in which the data format of the print data is PDF (which is an abbreviation for Portable Document Format) is assumed. In a case where the user determines to encrypt the print data, the control unit 70 of the portable device 50 uses a predetermined electronic signature to encrypt the print data and prepares PDF print data with the signature. Then, when the control unit 30 of the MFP 10 receives the print data from the portable device 50, the control unit 30 uses the predetermined electronic signature to decrypt the PDF print data with the signature. Meanwhile, in a case where the user determines not to encrypt the print data, the control unit 70 of the portable device 50 does not encrypt the print data (that is, the control unit 70 prepares normal PDF print data).

In both of the above-described first and second examples, as compared to a case where it is determined not to encrypt the print data, in a case where it is determined to encrypt the print data, the security of the print data is higher. In STEP S11 of FIG. 2, the control unit 70 of the portable device 50 generates security information representing secureness, in the case where it is determined to encrypt the print data, and generates security information representing insecureness, in the case where it is determined not to encrypt the print data. This point is different from Example 1-1. The other points are the same as Example 1-1.

Even in the present example, it is possible to achieve the same effects as those in Example 1-1. Also, in the present example, security information according to whether the print data is encrypted is an example of the data-related information and the processing-related information.

Example 1-4

In the Example 1-4, similarly to Example 1-3, security information is determined according to whether to encrypt the print data. Also, similarly to Example 1-2, the selecting unit 43 selects one AP being using "WPA2", in a case where the security information represents secureness, and selects one AP being using an authentication scheme other than "WPA2", in a case where the security information represents insecureness. Even in the present example, it is possible to achieve the same effects as those in the Example 1-2.

Example 1-5

In Example 1-5, in STEP S11 of FIG. 2, the control unit 70 of the portable device 50 generates NFC information which includes size information representing the data size of the print data, instead of the security information. Also, in STEP S44 of FIG. 3, first, with respect to each of the extracted one or more SSIDs, the selecting unit 43 checks a communication rate which an AP which is the source of the corresponding SSID realizes (that is, the communication rate information included in a PRes signal including the corresponding SSID). Then, in a case where the size information included in the NFC information is equal to or greater than a predetermined threshold value, the selecting unit 43 selects one SSID (that is, one AP) from which a communication rate of 100 Mbps or more has been confirmed. Meanwhile, in a case where the size information included in the NFC information is less than the predetermined threshold value, the selecting unit 43 selects one SSID (that is, one AP) from which a communication rate less than 100 Mbps has been confirmed.

In the present example, in a situation in which the data size of the print data is large, one AP which realizes a high communication rate is selected. Therefore, it is possible to reduce a time necessary for communication of print data having a large data size. Meanwhile, in a situation in which the data size of the print data is small, one AP which realizes a low communication rate is selected. Since the data size of the print data is small, even if a low communication rate is used, a time necessary for communication of the print data does not become long. If a configuration in which an AP which realizes a high communication rate is necessarily selected regardless of the data size of print data is used, the load of the corresponding AP increases. That is, if a configuration in which an AP which realizes a high communication rate is selected in a situation in which communication of print data having a small data size needs to be performed is used, it is feared to disrupt communication of a client device which needs to perform communication of large-sized data with the corresponding AP. According to the present example, it is possible to appropriately suppress occurrence of an event in which only some APs have large loads.

Example 1-6

In Example 1-6, in STEP S11 of FIG. 2, the control unit 70 of the portable device 50 generates NFC information which includes format information representing the data format of the print data, instead of the security information. Also, in STEP S44 of FIG. 3, in a case where the format information included in the NFC information represents "Uncompressed Bitmap", the selecting unit 43 selects one SSID (that is, one AP) from which a communication rate of 100 Mbps or more has been confirmed. Meanwhile, in a case where the format information included in the NFC information represents a data format (for example, "PDF" or "JPEG") other than "Uncompressed Bitmap", the selecting unit 43 selects one SSID (that is, one AP) from which a communication rate less than 100 Mbps has been confirmed.

A processing speed of the MFP 10 for processing print data depends on the data format of the print data. For example, a processing speed for print data having the data format "Uncompressed Bitmap" is higher than a processing speed for print data having the data format "PDF". In the present example, in a situation where the data format of the print data is "Uncompressed Bitmap", one AP which realizes a high communication rate is selected. Therefore, the MFP 10 can process the print data at a high speed while receiving the print data at a high speed, and thus can quickly supply the printed matter to the user.

Also, in the present example, in a situation where the data format of the print data is other than "Uncompressed Bitmap", one AP which realizes a low communication rate is selected. If a configuration in which one AP which realizes a high communication rate is selected in the situation where the data format of the print data is other than "Uncompressed Bitmap" is used, in the MFP 10, the print data receiving speed becomes higher than the print data processing speed. As a result, even if the print data is received, there is a possibility that it would be impossible to quickly process the print data. In view of these circumstances, in the present example, in the situation where the data format of the print data is other than "Uncompressed Bitmap", the MFP 10 selects one AP which realizes a low communication rate. Therefore, it is possible to appropriately suppress occurrence of an event in which only some APs have large loads. Also, in the present example, for example, "Uncompressed Bitmap" and "PDF" are examples of the first data format and the second data format, respectively.

Example 1-7

In Example 1-7, in STEP S11 of FIG. 2, the control unit 70 of the portable device 50 generates NFC information including occupancy rate information representing a CPU occupancy rate of the portable device 50, instead of the security information. The CPU occupancy rate of the portable device 50 means the ratio of a time when the CPU 72 performs the application process of FIG. 2, to a unit time. In a case where the CPU 72 performs only the application process of FIG. 2, the CPU occupancy rate of the portable device 50 has a comparatively large value (that is, 100%). Also, in a case where the CPU 72 performs the application process of FIG. 2 and any other processes in parallel, the CPU occupancy rate of the portable device 50 has a comparatively small value. That is, as the CPU occupancy rate of the portable device 50 increases, the portable device 50 can perform the application process of FIG. 2 at a higher speed, and as a result, in STEP S20 of FIG. 2, the portable device 50 can transmit the print data to the network at a higher speed.

Also, in STEP S44 of FIG. 3, in a case where the CPU occupancy rate represented by the occupancy rate information included in the NFC information is equal to or greater than a threshold value, the selecting unit 43 selects one SSID (that is, one AP) from which a communication rate of 100 Mbps or more has been confirmed. Meanwhile, in a case where the CPU occupancy rate represented by the occupancy rate information included in the NFC information is less than the threshold value, the selecting unit 43 selects one SSID (that is, one AP) from which a communication rate less than 100 Mbps has been confirmed.

In the present example, in a situation where the portable device 50 can transmit the print data to the network at a high speed since the CPU occupancy rate of the portable device 50 is high, one AP which realizes a high communication rate is selected. Therefore, the MFP 10 can receive the print data at a high speed, and thus can quickly supply the printed matter to the user. Also, in the present example, in a situation where the portable device 50 cannot transmit the print data to the network at a high speed since the CPU occupancy rate of the portable device 50 is low, one AP which realizes a low communication rate is selected. If a configuration in which an AP which realizes a high communication rate is selected in a situation where the CPU occupancy rate of the portable device 50 is small is used, there is a possibility that the speed at which the portable device 50 transmits the print data to the network would be lower than the communication rate which the corresponding AP realizes. Further, if a configuration in which an AP which realizes a high communication rate is selected in a situation where the CPU occupancy rate of the portable device 50 is small is used, it is feared to disrupt communication between the corresponding AP and a client device which needs to perform communication with the corresponding AP. In view of these circumstances, in the present example, in the situation where the CPU occupancy rate of the portable device 50 is small, the MFP 10 selects one AP which realizes a low communication rate. Therefore, it is possible to appropriately suppress occurrence of an event in which only some APs have large loads. Also, in the present example, the occupancy rate information is an example of a second capability-related information item.

Example 1-8

In Example 1-8, in STEP S11 of FIG. 2, the control unit 70 of the portable device 50 generates NFC information including residual amount information representing the residual memory amount of the portable device 50, instead of the security information. The residual memory amount of the portable device 50 means the size of an area of the memory 74 usable in the application process of FIG. 2. As the residual memory amount of the portable device 50 increases, the portable device 50 can perform the application process of FIG. 2 at a higher speed, and as a result, in STEP S20 of FIG. 2, the portable device 50 can transmit the print data to the network at a higher speed.

Also, in STEP S44 of FIG. 3, in a case where the residual memory amount represented by the residual amount information included in the NFC information is equal to or greater than a threshold value, the selecting unit 43 selects one SSID (that is, one AP) from which a communication rate of 100 Mbps or more has been confirmed. Meanwhile, in a case where the residual memory amount represented by the residual amount information included in the NFC information is less than the threshold value, the selecting unit 43 selects one SSID (that is, one AP) from which a communication rate less than 100 Mbps has been confirmed.

Even in the present example, the same effects as those of the Example 1-7 can be achieved. Also, in the present example, the residual amount information is an example of the second capability-related information item.

Example 1-9

In Example 1-9, in STEP S11 of FIG. 2, the control unit 70 of the portable device 50 generates NFC information including processing speed information representing the print data processing speed of the portable device 50, instead of the security information. The print data processing speed of the portable device 50 means a speed at which the portable device 50 transmits the print data to the network, and depends on the CPU occupancy rate and residual memory amount of the portable device 50. The memory 74 of the portable device 50 has a table stored therein for specifying the print data processing speed of the portable device 50 on the basis of the CPU occupancy rate and residual memory amount of the portable device 50. Therefore, in STEP S11 of FIG. 2, the control unit 70 of the portable device 50 checks the current CPU occupancy rate and residual memory amount of the portable device 50, and specifies the current print data processing speed of the portable device 50 by using the check results and the above-described table. As the print data processing speed of the portable device 50 increases, in STEP S20 of FIG. 2, the portable device 50 can transmit the print data to the network at a higher speed.

Also, in STEP S44 of FIG. 3, in a case where the print data processing speed represented by the processing speed information included in the NFC information is equal to or greater than a threshold value, the selecting unit 43 selects one SSID (that is, one AP) from which a communication rate of 100 Mbps or more has been confirmed. Meanwhile, in a case where the print data processing speed represented by the processing speed information included in the NFC information is less than the threshold value, the selecting unit 43 selects one SSID (that is, one AP) from which a communication rate less than 100 Mbps has been confirmed.

Even in the present example, the same effects as those of the Example 1-7 can be achieved. Also, in the present example, the processing speed information is an example of the second capability-related information item.

Example 2

Subsequently, the contents of Example 2 will be described with reference to FIG. 6. In the above-described Example 1, in STEP S44 of FIG. 3, the selecting unit 43 of the MFP 10 selects one AP on the basis of information obtained from the portable device 50 (that is, information of the portable device (50) side). Alternatively, in the present example, the selecting unit 43 selects one AP on the basis of information related to the MFP 10 (that is, information of the MFP (10) side).

Example 2-1

In STEP S44 of FIG. 3, first, a capability obtaining unit 45 checks the current CPU occupancy rate of the MFP 10 and obtains the occupancy rate information. Similarly to the above-described Example 1-7, the CPU occupancy rate of the MFP 10 means the ratio of a time when the CPU 32 performs the communication process of FIG. 3, to a unit time. As the CPU occupancy rate of the MFP 10 increases, the MFP 10 can perform the communication process of FIG. 3 at a higher speed, and as a result, in STEP S52 of FIG. 3, the MFP 10 can process the print data at a higher speed.

In a case where the CPU occupancy rate represented by the obtained occupancy rate information is equal to or greater than the threshold value, the selecting unit 43 selects one SSID (that is, one AP) from which a communication rate of 100 Mbps or more has been confirmed. Meanwhile, in a case where the CPU occupancy rate represented by the obtained occupancy rate information is less than the threshold value, the selecting unit 43 selects one SSID (that is, one AP) from which a communication rate less than 100 Mbps has been confirmed.

In the present example, in a situation where the MFP 10 can process the print data at a high speed since the CPU occupancy rate of the MFP 10 is high, one AP which realizes a high communication rate is selected. Therefore, the MFP 10 can process the print data at a high speed while receiving the print data at a high speed, and thus can quickly supply the printed matter to the user. Also, in the present example, in a situation where the MFP 10 cannot process the print data at a high speed since the CPU occupancy rate of the MFP 10 is low, one AP which realizes a low communication rate is selected. If a configuration in which an AP which realizes a high communication rate is selected in a situation where the CPU occupancy rate of the MFP 10 is low is used, in the MFP 10, the print data receiving speed becomes higher than the print data processing speed, and as a result, even if the print data is received, there is a possibility that it would be impossible to quickly process the print data. In view of these circumstances, in the present example, in a situation where the CPU occupancy rate of the MFP 10 is low, one AP which realizes a low communication rate is selected. Therefore, it is possible to appropriately suppress occurrence of an event in which only some APs have large loads. Also, in the present example, the occupancy rate information is an example of the first capability-related information item.

Example 2-2

In STEP S44 of FIG. 3, first, the capability obtaining unit 45 checks the current residual memory amount of the MFP 10 and obtains the residual amount information. Similarly to the above-described Example 1-8, the residual memory amount of the MFP 10 means the size of an area of the memory 34 usable in the communication process of FIG. 3. As the residual memory amount of the MFP 10 increases, the MFP 10 performs the communication process of FIG. 3 at a higher speed, and as a result, in STEP S52 of FIG. 3, the MFP 10 can process the print data at a higher speed.

In a case where a residual memory amount represented by the obtained residual amount information is equal to or greater than a threshold value, the selecting unit 43 selects one SSID (that is, one AP) from which a communication rate of 100 Mbps or more has been confirmed. Meanwhile, in a case where the residual memory amount represented by the obtained residual amount information is less than the threshold value, the selecting unit 43 selects one SSID (that is, one AP) from which a communication rate less than 100 Mbps has been confirmed.

Even in the present example, the same effects as those of Example 2-1 can be achieved. Also, in the present example, the residual amount information is an example of the first capability-related information item.

Example 2-3

In STEP S44 of FIG. 3, first, a capability obtaining unit 45 checks the current CPU occupancy rate and residual memory amount of the MFP 10 and obtains the print data processing speed information of the MFP 10. The print data processing speed of the MFP 10 means a speed at which the MFP 10 processes the print data, and depends on the CPU occupancy rate and residual memory amount of the MFP 10. As the print data processing speed of the MFP 10 increases, in STEP S52 of FIG. 3, the MFP 10 can process the print data at a higher speed. The memory 34 of the MFP 10 has a table stored therein for specifying the print data processing speed of the MFP 10 on the basis of the CPU occupancy rate and residual memory amount of the MFP 10. Therefore, the capability obtaining unit 45 checks the current CPU occupancy rate and residual memory amount of the MFP 10, and specifies the current print data processing speed of the MFP 10 by using the check results and the above-described table.

Also, in a case where the print data processing speed represented by the obtained processing speed information is equal to or greater than a threshold value, the selecting unit 43 selects one SSID (that is, one AP) from which a communication rate of 100 Mbps or more has been confirmed. Meanwhile, in a case where the print data processing speed represented by the obtained processing speed information is less than the threshold value, the selecting unit 43 selects one SSID (that is, one AP) from which a communication rate less than 100 Mbps has been confirmed.

Even in the present example, the same effects as those of Example 2-1 can be achieved. Also, in the present example, the processing speed information is an example of the first capability-related information item.

Example 3

Subsequently, the contents of Example 3 will be described with reference to FIG. 7. In the present example, in STEP S44 of FIG. 3, the selecting unit 43 of the MFP 10 selects one AP on the basis of both of the information of the portable device (50) side and the information of the MFP (10) side.

Example 3-1

Similarly to Example 1-1, the NFC information includes the security information according to whether a password is set to the print data. Also, similarly to Example 2-1, in STEP S44 of FIG. 3, the capability obtaining unit 45 checks the current CPU occupancy rate of the MFP 10 and obtains the occupancy rate information. Also, as shown in a table of FIG. 7, the selecting unit 43 selects one AP on the basis of both of the contents of the security information included in the NFC information (that is, secureness or insecureness), and the CPU occupancy rate represented by the obtained occupancy rate information. In the present example, the same effects as those of Examples 1-1 and 2-1 can be achieved.

Example 3-2

The combination of the information of the portable device (50) side and the information of the MFP (10) side is not limited to that described in Example 3-1, but may be any combination of Examples 1-1 to 1-9 of FIG. 5 and Examples 2-1 to 2-3 of FIG. 6. For example, the information of the portable device (50) side may be size information representing the data size of the print data, and the information of the MFP (10) side may be residual amount information representing the residual memory amount of the MFP 10. In this case, for example, the selecting unit 43 may select one AP which realizes a high communication rate in Case 1 where the size information represents a data size of a first threshold value or more, and the residual amount information represents a residual memory amount of a second threshold value or more, select one AP which realizes a low communication rate in Case 2 where the size information represents a data size of the first threshold value or more, and the residual amount information represents a residual memory amount less than the second threshold value, and select one AP which realizes a low communication rate regardless of the residual memory amount represented by the residual amount information in Case 3 where the size information represents a data size less than the first threshold value.

Also, for example, the information of the portable device (50) side may be residual amount information representing the residual memory amount of the portable device 50, and the information of the MFP (10) side may be residual amount information representing the residual memory amount of the MFP 10. In this case, for example, the selecting unit 43 may select one AP which realizes a high communication rate in Case 1 where both of the residual amount information of the portable device 50 and the residual amount information of the MFP 10 represent residual memory amounts of threshold values or more, and select one AP which realizes a low communication rate in Case 2 where both of the residual amount information of the portable device 50 and the residual amount information of the MFP 10 do not represent residual memory amounts of the threshold values or more. Also, for example, the selecting unit 43 may select one AP which realizes a high communication rate (for example, a rate of 100 Mbps or more) in Case 1 where both of the residual amount information of the portable device 50 and the residual amount information of the MFP 10 represent residual memory amounts of the threshold values or more, select one AP which realizes a medium communication rate (for example, a rate equal to or greater than 10 Mbps and less than 100 Mbps or more) in Case 2 where only one of the residual amount information of the portable device 50 and the residual amount information of the MFP 10 represents a residual memory amount less than a corresponding threshold value, and select one AP which realizes a low communication rate (for example, a rate less than 10 Mbps) in Case 3 where both of the residual amount information of the portable device 50 and the residual amount information of the MFP 10 represent residual memory amounts less than the threshold values.

Example 4

Subsequently, the contents of Example 4 will be described with reference to FIGS. 8 and 9. In the above-described Examples 1 to 3, the MFP 10 selects one AP on the basis of the information of the portable device 50 and/or the information of the MFP 10. Alternatively, in the present example, the portable device 50 selects one AP on the basis of the information of the portable device 50. The memory 74 of the portable device 50 cumulatively stores one or more participation information items corresponding to one or more normal Wi-Fi networks which the portable device 50 has participated in.

Figure 8:
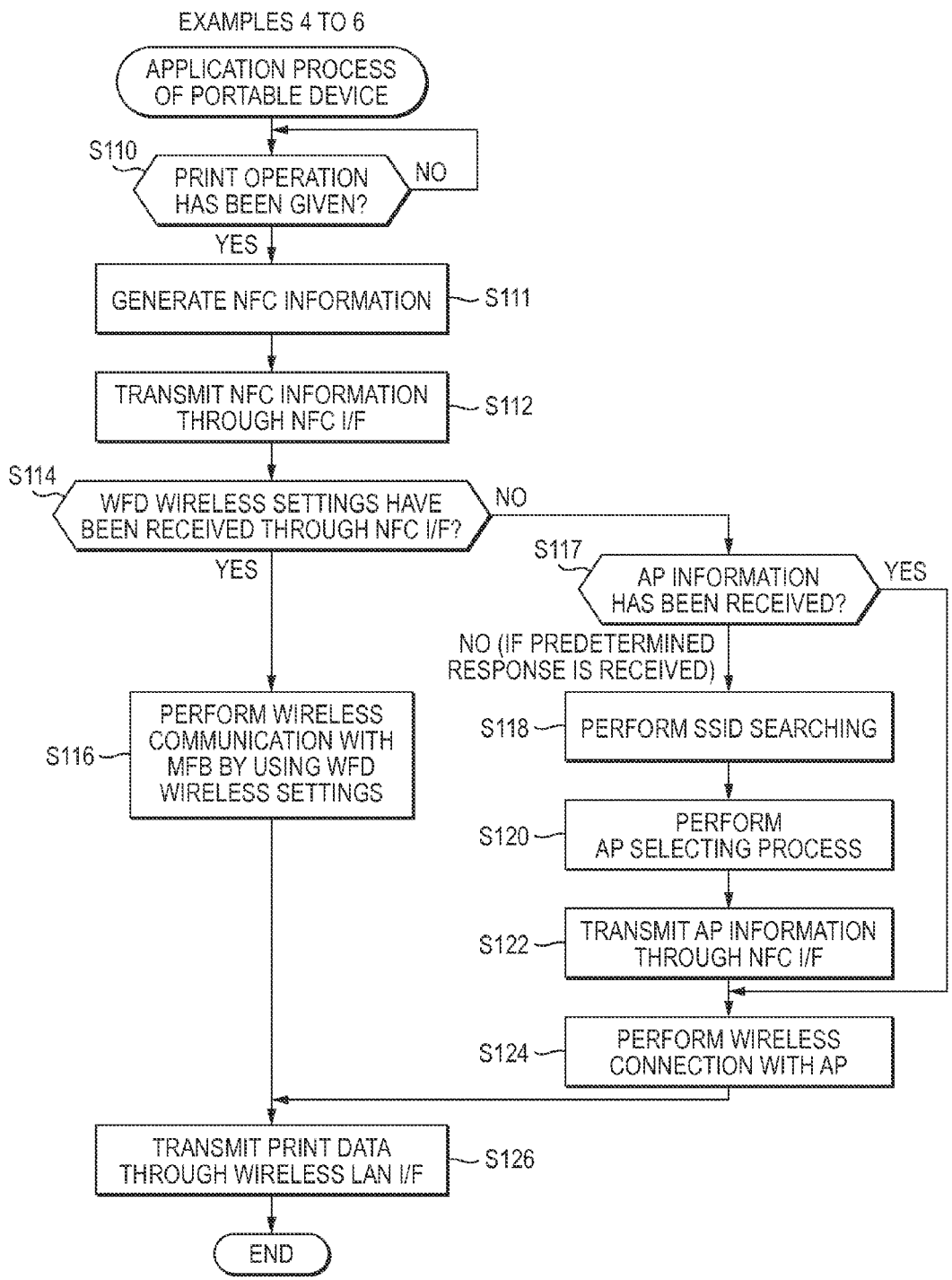
FIG. 8 illustrates a flow chart of another application process of the portable device.

(Application Process of Portable Device 50 Shown in FIG. 8)

STEP S110 of FIG. 8 is identical to STEP S10 of FIG. 2. STEPS S111 and S112 are different from STEPS S11 and S12 in that any security information is not included in the NFC information. In STEP S114, the control unit 70 of the portable device 50 determines whether any WFD wireless settings have been received from the MFP 10 through the NFC I/F 62. The control unit 70 proceeds to STEP S116 in a case where WFD wireless settings have been received from the MFP 10, and proceeds to STEP S117 in a case where any WFD wireless settings have not been received from the MFP 10. STEP S116 is identical to STEP S16 which is performed in a case where WFD wireless settings have been received in STEP S14 of FIG. 2.

In STEP S117, the control unit 70 determines whether any AP information has been received from the MFP 10 through the NFC I/F 62. In a case where AP information has been received, the control unit 70 skips STEPS S118 to S122 and proceeds to STEP S124. Specifically, in a case where the MFP 10 cannot join the portable device 50 into a WFD network in which the MFP 10 operates in the G/O status, or a normal Wi-Fi network in which the MFP 10 participates in currently (in a case of "NO" in STEP S141 of FIG. 9), the MFP 10 transmits a predetermined response to the portable device 50. The predetermined response is a response which does not include WFD wireless settings or normal Wi-Fi wireless settings but includes security information. Also, the predetermined response may be an empty response which does not include even any security information. A receiving unit 81 of the portable device 50 receives the predetermined response from the MFP 10 through the NFC I/F 62. In this case, the control unit 70 determines "NO" in STEP S117, and proceeds to STEP S118.

In STEP S118, a communication obtaining unit 84 of the portable device 50 performs SSID searching by using the same method as that of STEP S42 of FIG. 3. As a result, the communication obtaining unit 84 obtains a plurality of PRes signals from the plurality of AP 4a and 4b. In STEP S120, a selecting unit 83 of the portable device 50 selects one AP from the plurality of AP 4a and 4b. The selecting unit 83 first extracts one or more SSIDs matched with one ore more SSIDs included in the one or more participation information items stored in the memory 74, from the plurality of SSIDs included in the plurality of PRes signals. Subsequently, the selecting unit 83 selects one SSID from the extracted one or more SSIDs, so as to select one AP. A specific method for selecting one AP will be described below in detail.

In STEP S122, a transmitting unit 82 of the portable device 50 prepares AP information by using the same method as that of STEP S46 of FIG. 3. Subsequently, the transmitting unit 82 transmits the AP information to the MFP 10 through the NFC I/F 62. Incidentally, after transmitting the AP information in STEP S122, the control unit 70 performs control such that, for example, outputting a predetermined tone from the portable device 50 for notifying the user of the portable device 50 that the NFC communication has terminated. Therefore, the user can recognize that it is possible to keep the portable device 50 away from the MFP 10. In STEP S124 which is performed after STEP S122, a communicating unit 86 of the portable device 50 performs wireless connection with the selected AP. In STEP S124 which is performed in a case of "YES" in STEP S117, the communicating unit 86 performs wireless connection with an AP by using the AP information received from the MFP 10. In STEP S126, the communicating unit 86 transmits the print data to the MFP 10 through the wireless LAN I/F 60 by using the same method as that of STEP S20 of FIG. 2.

(Communication Process of MFP 10 Shown in FIG. 9)

STEPS S130 to S141 and S149 of FIG. 9 are identical to STEPS S30 to S41 and S49 of FIG. 3. In STEP S142, the control unit 30 of the MFP 10 transmits a predetermined response to the portable device 50 through the NFC I/F 22. In STEP S144, the control unit 30 receives AP information from the portable device 50 through the NFC I/F 22. STEPS S146, S150, and S152 of FIG. 9 are identical to STEPS S48, S50, and S52 of FIG. 3.

Example 4-1

Subsequently, the contents of the AP selecting process of STEP S120 of FIG. 8 will be described. An AP selecting method of the present example is identical to that of Example 1-1. That is, in a case where the user determines to set a password to the print data (that is, a case where the security information represents secureness), the selecting unit 83 selects one SSID (that is, one AP) from which "AES" has been confirmed. Meanwhile, in a case where the user determines not to set any password to the print data (that is, a case where the security information represents insecureness), the selecting unit 83 selects one SSID (that is, one AP) from which an encryption scheme (for example, "TKIP" or "WEP") other than "AES" has been confirmed.

(Specific Example of Example 4-1 Shown in FIG. 10)

In a sequence diagram of FIG. 10, the same situation as that of FIG. 4 is assumed. Also, the memory 74 of the portable device 50 has stored a participation information item corresponding to the AP 4a, and a participation information item corresponding to the AP 4b.

Upon receiving the predetermined response from the MFP 10 through the NFC I/F 62 ("NO" in STEP S117 of FIG. 8), in STEP S118, the portable device 50 performs SSID searching. As a result, the portable device 50 receives a PRes signal from each of the AP 4a and 4b.

In CASE "A" of FIG. 10, a password has been set to the print data (that is, the security information represents secureness). Therefore, in STEP S120, the portable device 50 selects the AP 4a being using the encryption scheme "AES", from the plurality of AP 4a and 4b. Next, in STEP S122, the portable device 50 transmits AP information including the SSID "aaa" representing the AP 4a, to the MFP 10 through the NFC I/F 62. Subsequently, in STEP S124, the portable device 50 performs wireless connection with the AP 4a so as to join the normal Wi-Fi network which the AP 4a forms. Next, the portable device 50 transmits the print data to the AP 4a through the wireless LAN I/F 60. The AP 4a transmits the print data to the MFP 10.

Meanwhile, in CASE "B" of FIG. 10, any password has not been set to the print data (that is, the security information represents insecureness). Therefore, in STEP S120, the portable device 50 selects the AP 4b being using the encryption scheme "TKIP", from the plurality of AP 4a and 4b. Next, in STEP S122, the portable device 50 transmits AP information including the SSID "bbb" representing the AP 4b, to the MFP 10 through the NFC I/F 22. Subsequently, in STEP S124, the portable device 50 performs wireless connection with the AP 4b so as to join the normal Wi-Fi network which the AP 4b forms. Next, the portable device 50 transmits the print data to the AP 4b through the wireless LAN I/F 60. The AP 4b transmits the print data to the MFP 10.

Even in the present example, the same effects as those of Example 1-1 can be achieved. A case of "NO" in STEP S134 of FIG. 9, or a case where STEP S138 is performed is an example of the first case. The case of "YES" in STEP S134 of FIG. 9, or the case of "YES" in STEP S136 is an example of the second case. Wireless settings transmitted in STEP S140 of FIG. 9 and wireless settings included in AP information to be transmitted in STEP S149 are examples of first wireless settings and second wireless settings, respectively.

Example 4-2

In STEP S120 of FIG. 8, the selecting unit 83 of the portable device 50 may perform an AP selecting process like in Examples 1-2 to 1-9 by using the information of the portable device (50) side of any one of Examples 1-2 to 1-9 of FIG. 5. Also, in a case where an AP selecting process similar to Examples 1-7 to 1-9 is performed, a capability obtaining unit 85 of the portable device 50 checks the current status of the portable device 50 and obtains the occupancy rate information, residual amount information, or processing speed information of the portable device 50. Even in the present example, the same effects as those of Examples 1-2 to 1-9 can be achieved.

Example 5

In the present example, in STEP S142 of FIG. 9, the control unit 30 of the MFP 10 transmits a predetermined response including the occupancy rate information, residual amount information, or processing speed information of the MFP 10, to the portable device 50 through the NFC I/F 22. As a result, the receiving unit 81 of the portable device 50 receives the predetermined response including the occupancy rate information, residual amount information, or processing speed information of the MFP 10, from the MFP 10 through the NFC I/F 22. The portable device 50 selects one AP on the basis of the information of the MFP (10) side included in the predetermined response. That is, in STEP S120 of FIG. 8, the selecting unit 83 of the portable device 50 performs an AP selecting process like in the Examples 2-1 to 2-3 by using the information of the MFP (10) side of any one of Examples 2-1 to 2-3 of FIG. 6. Even in the present example, the same effects as those of Examples 2-1 to 2-3 can be achieved.

Example 6

In the present example, the portable device 50 selects one AP on the basis of both of the information of the portable device (50) side and the information of the MFP (10) side. That is, in STEP S120 of FIG. 8, the selecting unit 83 of the portable device 50 selects one AP on the basis of both of the information of the portable device (50) side, and the information of the MFP (10) side included in the predetermined response. The selecting unit 83 of the portable device 50 performs an AP selecting process like in Example 3-1 or 3-2 of FIG. 7. Even in the present example, the same effects as those of Example 3-1 or 3-2 can be achieved.

Although exemplary embodiments of the present invention have been described above in detail, they are merely illustrative and do not limit the scope of claims. In technologies to be described in claims, examples obtained by changing or modifying the above-described specific examples are included. Modifications of the above-described examples will be listed below.

(Modification 1)

In each of the above-described examples, since there is no G/O device around the MFP 10, in the SSID searching of STEP S42 of FIG. 3, the communication obtaining unit 44 does not receive a PRes signal from any G/O device. Instead of this, there may be a G/O device around the MFP 10. In this case, the communication obtaining unit 44 may receive a PRes signal from the G/O device. Further, the communication obtaining unit 44 may select one relaying device from the G/O device and the plurality of AP 4*a* and 4*b*. In the present modification, the G/O device and the plurality of AP 4*a* and 4*b* are examples of the plurality of relaying devices.

(Modification 2)

In the above-described Examples 1-5, and 1-7 to 1-9, Examples 2-1 to 2-3, and so on, the selecting unit 43 or 83 selects one AP by using only one threshold value. Instead of this, the selecting unit 43 or 83 may select one AP by using a plurality of threshold values. For example, in Example 1-5, the selecting unit 43 may select one AP which realizes a communication rate of 100 Mbps or more, in Case 1 where the data size is a first threshold value or more, select one AP which realizes a communication rate equal to or greater than 10 Mbps and less than 100 Mbps, in Case 2 where the data size is less than the first threshold value and is equal to or greater than a second threshold value, and select one AP which realizes a communication rate less than 10 Mbps, in Case 3 where the data size is less than the second threshold value.

(Modification 3)

For example, in Example 1-6 and so on, the selecting unit 43 or 83 may select one AP which realizes a communication rate of 100 Mbps or more, in Case 1 where the data format is "Uncompressed Bitmap", select one AP which realizes a communication rate equal to or greater than 10 Mbps and less than 100 Mbps or more, in Case 2 where the data format is "JPEG", and select one AP which realizes a communication rate less than 10 Mbps, in Case 3 where the data format is "PDF".

(Modification 4)

Information which the selecting unit 43 or 83 uses in the AP selecting process is not limited to the information of the portable device (50) side and the information of the MFP (10) side shown in FIGS. 4 to 6. For example, the following modifications can be given as examples.

(Modification 4-1)

For example, the selecting unit 83 of the portable device 50 may select one AP on the basis of security compliance information representing whether the MFP 10 has a capability to decrypt the print data. That is, the selecting unit 83 may select one AP like in a case of "sureness" of Example 1-3 or 1-4 of FIG. 5, in a case where the MFP 10 has a capability to decrypt the print data, and select one AP like in a case of "insecureness" of Example 1-3 or 1-4 of FIG. 5, in a case where the MFP 10 has no capability to decrypt the print data. In the present modification, the security compliance information is an example of the second capability-related information item.

(Modification 4-2)

For example, the selecting unit 43 or 83 may select one AP on the basis of print resolution information representing a print resolution designated by user's operation on the operation unit 52 of the portable device 50. More specifically, in a case where the print resolution designated by the user is a threshold value or more, like in the case of Example 1-5 of FIG. 5 where the data size is the threshold value or more, the selecting unit 43 or 83 may select an AP which realizes a communication rate of 100 Mbps. Meanwhile, in a case where the print resolution designated by the user is less than the threshold value, like in the case of Example 1-5 of FIG. 5 where the data size is less than the threshold value, the selecting unit 43 or 83 may select an AP which realizes a communication rate less than 100 Mbps. In the present modification, the print resolution information is an example of the data-related information. Also, the user may designate a print resolution by operating the operation unit 12 of the MFP 10. In this case, the print resolution information is information of the MFP (10) side.

(Modification 4-3)

In Modification 4-2, instead of the print resolution, a scan resolution may be used. For example, instead of a situation where the print data is transmitted from the portable device 50 to the MFP 10, a situation where scan data (that is, data which the scanning unit 18 generates by scanning a document) is transmitted from the MFP 10 to the portable device 50 is assumed. In this case, the selecting unit 43 or 83 may select one AP on the basis of scan resolution information representing a scan resolution designated by user's operation on the operation unit 52 of the portable device 50. In the present modification, the scan resolution information is an example of the data-related information. Further, the scan data is an example of the target data. Also, the user may designate a scan resolution by operating the operation unit 12 of the MFP 10. In this case, the scan resolution information is information of the MFP (10) side.

(Modification 5)

In each of the above-described examples, the selecting unit 43 or 83 selects one AP by using at least one side of the information of the portable device (50) side and the information of the MFP (10) side, and the plurality of PRes signals. Instead of this, the selecting unit 43 or 83 may select one AP by using at least one side of the information of the portable device (50) side and the information of the MFP (10) side, without using the plurality of PRes signals. For example, the memory 34 of the MFP 10 may have a table stored therein such that information representing secureness is associated with a first SSID registered in advance by the user, and information representing insecureness is associated with a second SSID registered in advance by the user. In this case, the selecting unit 43 may select the first SSID with reference to the table in a case where the security information represents secureness, and select the second SSID with reference to the table in a case where the security information represents insecureness. According to this configuration, it is possible to select one AP without using the plurality of PRes signals. That is, the selecting unit 43 or 83 needs only to select a specific relaying device by using the processing-related information.

(Modification 6)

The AP information may not include the SSID of the selected AP, and may include other information capable of specifying the selected AP (for example, the BSSID of the selected AP, the IP address of the selected AP, or the like).

(Modification 7)

In Example 1-1 of FIG. 5, since the AP selecting process is performed according to the encryption scheme information, each PRes signal may not include authentication scheme information and communication rate information. Also, in Example 1-2, since the AP selecting process is performed according to the authentication scheme information, each PRes signal may not include encryption scheme information and communication rate information. Also, in Example 1-5, since the AP selecting process is performed according to the communication rate information, each PRes signal may not include authentication scheme information and encryption scheme information. In general, each communication-related information may not include at least one information item of the authentication scheme information, the encryption scheme information, and the communication rate information.

(Modification 8)

In Example 1-1 or the like described above, the selecting unit 43 or 83 determines the level of the security of the print data according to whether the security information includes a password for allowing printing of the print data. That is, in Example 1-1 or the like described above, printing of the print data is an example of outputting of the print data. However, for example, in a case where the target data is data for display, the selecting unit 43 or 83 may determine the level of the security of the data for display according to whether the security information includes a password for allowing displaying of the data for display.

(Modification 9)

The first type of interface is not limited to an interface for performing NFC communication, but may be an interface for performing infrared communication, an interface for performing Bluetooth (which is a registered trademark), or an interface for performing TransferJet. In general, the communication rate of wireless communication through the second type of interface may be higher than the communication rate of wireless communication through the first type of interface.

(Modification 10)

The first type of interface and the second type of interface may be two interfaces (for example, two IC chips) configured separately like in each of the above-described examples, or may be one interface (for example, one IC chip) configured as one unit.

(Modification 11)

The master status is not limited to the G/O status of the WFD, but may be any status in which in a wireless network, a corresponding device manages each of the other devices (for example, a status in which in a wireless network, a corresponding device can relay wireless communication between any other devices). Also, the slave status is not limited to the client status of the WFD, but may be any status in which in a wireless network, a corresponding device is managed by any other device being in the master status.

(Modification 12)

In STEPS S40, S46, and S49 of FIG. 3, the transmitting unit 42 may transmit the wireless settings to the portable device 50 through an interface different from the NFC I/F 22.

(Modification 13)

In FIG. 3, STEPS S36, S38, S41, and S49 may not be performed. That is, in the case of "NO" in STEP S32, the communication process may proceed to STEP S42. Also, in the case of "YES" in STEP S36, the communication process may proceed to STEP S42. Further, in FIG. 3, STEPS S34, S41, and S49 may not be performed. That is, in the case of "YES" in STEP S32, the communication process may proceed to STEP S40. Also, in the case of "YES" in STEP S36, the communication process may proceed to STEP S42. In general, the first communication device may include at least the transmitting unit and the communicating unit.

(Modification 14)

The first communication device ad the second communication device are not limited to the MFP 10 and the portable device 50, but may be any other communication devices (for example, printers, scanners, facsimile machines, copy machines, telephones, desktop PCs, notebook PCs, tablet PCs, servers, mobile phones, PDA terminals, etc.). Also, the target data is not limited to print data and scan data, but may be other data (for example, audio data, facsimile data, etc.).

(Modification 15)

In the above-described examples, the CPU 32 of the MFP 10 performs programs (that is, software) stored in the memory 34 to implement the functions of components 41 to 46. Alternatively, at least one of the components 41 to 49 may be implemented by hardware such as a logic circuit. Similarly, at least one of components 81 to 86 may be implemented by hardware such as a logic circuit.

The technical elements explained in the present specification or drawings provide technical utility either independently or through various combinations. The present invention is not limited to the combinations described at the time the claims are filed. Further, the purpose of the technologies illustrated by the present specification or drawings is to satisfy multiple objectives simultaneously, and satisfying any one of those objectives gives technical utility to the present invention.

Exemplary embodiments of the present invention can provide at least the following illustrative, non-limiting embodiments:

The first communication device may further comprise: a first type of interface configured to perform wireless communication with the second communication device; and a second type of interface configured to perform wireless communication with the second communication device, wherein a communication rate of wireless communication through the second type of interface is higher than a communication rate of wireless communication through the first type of interface. The transmitting unit may be configured to: in the first case, transmit the first wireless settings to the second communication device through the first type of interface; and in the second case, transmit the second wireless settings to the second communication device through the first type of interface. Each of the first type of wireless network and the second type of wireless network may be a wireless network for performing wireless connection through the second type of interface.

According thereto, the first communication device is able to appropriately use the first type of interface to transmit the first or second network settings to the second communication device. Also, the first communication device is able to appropriately use the second type of interface to perform wireless communication of target data with the second communication device.

In a case where the first communication device operates in the master status and belongs to the first type of wireless network, a maximum number of slave devices capable of belonging to the first type of wireless network may be N, wherein N is an integer of 1 or more. The slave devices may be devices each of which is configured to operate in the slave status and belong to the first type of wireless network. The processor may be configured to cause the first communication device to further operate as a first determining unit configured to determine whether the number of slave devices belonging to the first type of wireless network currently is less than N or equal to N, in a case where the first communication device operates in the master status and belongs to the first type of wireless network. The transmitting unit may be configured to: in the first case where it is determined that the number of slave devices is less than N, transmit the first wireless settings to the second communication device; and in the second case where it is determined that the number of slave devices is N, transmit the second wireless settings to the second communication device.

According thereto, the first communication device is able to appropriately join the second communication device to the first or second type of wireless network according to whether the number of slave devices is less than or equal to N.

The processor may be configured to cause the first communication device to further operate as a forming unit configured to newly form the first type of wireless network for enabling the first communication device to operate in the master status in a case where the first communication device does not belong to the first type of wireless network. The transmitting unit may be configured to transmit the first wireless settings to the second communication device when the first type of wireless network is newly formed.

According thereto, the first communication device is able to newly form the first type of wireless network for enabling the first communication device to operate in the master status and appropriately perform control such that the second communication device joins the first type of wireless network.

The transmitting unit may be configured to transmit the second wireless settings to the second communication device in the second case where the first communication device operates in the slave status and belongs to the first type of wireless network.

According thereto, in the second case where the first communication device operates in the slave status and belongs to the first type of wireless network currently, the first communication device is able to appropriately perform control such that the second communication device joins the second type of wireless network.

The processor may be configured to cause the first communication device to further operate as: a second determining unit configured to determine whether the first communication device belongs to the second type of wireless network in the second case; and a searching unit configured to search for a relaying device existing around the first communication device in a case where it is determined in the second case that the first communication device does not belong to the second type of wireless network. The transmitting unit may be configured to: in a case where it is determined in the second case that the first communication device belongs to the second type of wireless network, transmit the second wireless settings to the second communication device, the second wireless settings being for joining the second communication device to the second type of wireless network which the first communication device belongs to; and in a case where it is determined in the second case that the first communication device does not belong to the second type of wireless network, transmit the second wireless settings to the second communication device, the second wireless settings being for joining the second communication device to the second type of wireless network that includes the specific relaying device of one or more relaying devices found by the searching.

According thereto, in the second case, the first communication device is able to perform an appropriate process according to whether the first communication device belongs to the second type of wireless network currently, and thus to appropriately perform control such that the second communication device joins the second type of wireless network.

The processor may be configured to cause the first communication device to further operate as a selecting unit configured to select the specific relaying device from a plurality of relaying devices by using processing-related information related to processing of the target data in a case where the plurality of relaying devices has been found by the searching.

According thereto, the first communication device is able to use the processing-related information to select an appropriate relaying device.

The searching unit may be configured to obtain a communication-related information from each of the plurality of relaying devices. Each of the plurality of communication-related information obtained from the plurality of relaying devices may include at least one of: authentication scheme information representing an authentication scheme which a relaying device which is the source of the corresponding communication-related information is using currently; encryption scheme information representing an encryption scheme which the relaying device which is the source of the corresponding communication-related information is using currently; and communication rate information representing a communication rate of wireless communication which the relaying device which is the source of the corresponding communication-related information used. The selecting unit may be configured to select the specific relaying device from the plurality of relaying devices by using the processing-related information and the plurality of communication-related information.

According thereto, the first communication device is able to use the processing-related information and the plurality of communication-related information to select an appropriate relaying device.

The selecting unit may select the specific relaying device by using the processing-related information and the plurality of communication-related information, the processing-related information including data-related information related to the target data.

According thereto, the first communication device is able to use the data-related information to select an appropriate relaying device.

The target data may be data which is to be transmitted from the second communication device to the first communication device. The processor may be configured to cause the first communication device to further operate as a receiving unit configured to receive the data-related information from the second communication device. The selecting unit may be configured to select the specific relaying device by using the processing-related information and the plurality of communication-related information.

According thereto, the first communication device is able to use the data-related information which is received from the second communication device, to select an appropriate relaying device.

Each of the plurality of communication-related information may include the authentication scheme information representing the authentication scheme which is being used by the relaying device that is the source of the corresponding communication-related information. The selecting unit may be configured to: in a case where the data-related information represents that the target data has a first level of security, select the specific relaying device using a first authentication scheme from the plurality of relaying devices; and in a case where the data-related information represents that the target data has a second level of security that is lower than the first level of security, select the specific relaying device using a second authentication scheme, which is different from the first authentication scheme, from the plurality of relaying devices.

According thereto, the first communication device is able to select an appropriate relaying device according to the security of the target data.

Each of the plurality of communication-related information may include the encryption scheme information representing the encryption scheme which is being used by the relaying device that is the source of the corresponding communication-related information. The selecting unit may be configured to: in a case where the data-related information represents that the target data has a first level of security, select the specific relaying device using a first encryption scheme from the plurality of relaying devices; and in a case where the data-related information represents that the target data has a second level of security that is lower than the first level of security, select the specific relaying device using a second encryption scheme, which is different from the first authentication scheme, from the plurality of relaying devices.

According thereto, the first communication device is able to select an appropriate relaying device according to the security of the target data.

In a case where the data-related information includes a password for allowing outputting of the target data, the selecting unit may determine that the security of the target data is comparatively high, and in a case where the data-related information includes no password, the selecting unit may determine that the security of the target data is comparatively low.

According thereto, the first communication device is able to appropriately determine the level of the security of the target data.

Each of the plurality of communication-related information may include communication rate information representing the communication rate of wireless communication using a relaying device which is the source of the corresponding communication-related information. In a case where the data-related information indicates that the data size of the target data is comparatively large, the selecting unit may select a specific relaying device for realizing a comparatively high communication rate, from among the plurality of relaying devices, and in a case where the data-related information represents that the data size of the target data is comparatively small, the selecting unit may select a specific relaying device for realizing a comparatively low communication rate, from among the plurality of relaying devices.

According thereto, the first communication device is able to select an appropriate relaying device according to the data size of the target data.

Each of the plurality of communication-related information may include communication rate information representing the communication rate of wireless communication using a relaying device which is the source of the corresponding communication-related information. In a case where the data-related information represents that the target data has a first data format, the selecting unit may select a specific relaying device for realizing a comparatively high communication rate, from among the plurality of relaying devices, and in a case where the data-related information represents that the target data has a second data format different from the first data format, the selecting unit may select a specific relaying device for realizing a comparatively low communication rate, from among the plurality of relaying devices.

According thereto, the first communication device is able to select an appropriate relaying device according to the data format of the target data.

The selecting unit may select a specific relaying device on the basis of: the plurality of communication-related information and the processing-related information including at least one capability-related information item of a first capability-related information item relative to the capability of the first communication device to perform the target data; and a second capability-related information item relative to the capability of the second communication device to perform the target data.

According thereto, the first communication device is able to use the capability-related information items to select an appropriate relaying device.

The processor may cause the first communication device to further operate as a capability obtaining unit configured to check a current status of the first communication device to obtain the first capability-related information item. The selecting unit may select a specific relaying device on a basis of the plurality of communication-related information and processing-related information including the obtained first capability-related information item.

According thereto, the first communication device is able to select an appropriate relaying device on the basis of the first capability-related information item relative to the capability of the first communication device.

The processor may cause the first communication device to further operate as a receiving unit configured to receive the second capability-related information item from the second communication device. The selecting unit may select a specific relaying device on the basis of the plurality of communication-related information and processing-related information including the obtained second capability-related information item.

According thereto, the first communication device is able to select an appropriate relaying device on the basis of the second capability-related information item relative to the capability of the second communication device.

Each of the plurality of communication-related information may include communication rate information representing the communication rate of wireless communication using a relaying device which is the source of the corresponding communication-related information. In a case where at least once capability-related information item represents that the capability to process the target data is comparatively high, the selecting unit may select a specific relaying device for realizing a comparatively high communication rate, from among the plurality of relaying devices, and in a case where at least once capability-related information item represents that the capability to process the target data is comparatively low, the selecting unit may select a specific relaying device for realizing a comparatively low communication rate, from among the plurality of relaying devices.

According thereto, the first communication device is able to select an appropriate relaying device according to the capability to process the target data.

In a case where a value represented by at least one capability-related information item is equal to or larger than a predetermined threshold value, the selecting unit may determine that the capability to process the target data is comparatively high, and in a case where a value represented by at least one capability-related information item is less than the predetermined threshold value, the selecting unit may determine that the capability to process the target data is comparatively low.

According to this configuration, the first communication device is able to determine the level of the capability to process the target data.

The selecting unit may select a specific relaying device on the basis of: the data-related information relative to the target data, the processing-related information including at least one capability-related information item of the first capability-related information item relative to the capability of the first communication device to process the target data and the second capability-related information item relative to the capability of the second communication device to process the target data; and the plurality of communication-related information.

According to this configuration, the first communication device is able to use the data-related information and the capability-related information items to select an appropriate relaying device.

What is claimed is:

1. A first communication device configured to operate in a master status or in a slave status and to belong to a first type of wireless network, the first communication device comprising:
    a processor; and
    a memory storing computer readable instructions that, when executed by the processor, cause the first communication device to operate as:
    a transmitting unit configured to:
        transmit first wireless settings, which is for joining the first type of wireless network, to a second communication device in a first case where the second communication device can join the first type of wireless network in a specific mode for performing direct wireless communication with the first communication device without intermediating of a relaying device; and
        transmit second wireless settings, which is for joining a second type of wireless network, to the second communication device in a second case where the second communication device cannot join the first type of wireless network in the specific mode, wherein the second type of wireless network includes a specific relaying device configured separately from the first communication device and the second communication device; and
    a communicating unit configured to:
        in the first case, perform direct wireless communication of target data with the second communication device by using the first type of wireless network; and
        in the second case, perform wireless communication of the target data with the second communication device through the specific relaying device by using the second type of wireless network.

2. The first communication device according to claim 1, further comprising:
    a first type of interface configured to perform wireless communication with the second communication device; and
    a second type of interface configured to perform wireless communication with the second communication device, wherein a communication rate of wireless communication through the second type of interface is higher than a communication rate of wireless communication through the first type of interface,
    wherein the transmitting unit is configured to:
        in the first case, transmit the first wireless settings to the second communication device through the first type of interface; and
        in the second case, transmit the second wireless settings to the second communication device through the first type of interface, and
    wherein each of the first type of wireless network and the second type of wireless network is a wireless network for performing wireless connection through the second type of interface.

3. The first communication device according to claim 1,
    wherein, in a case where the first communication device operates in the master status and belongs to the first type of wireless network, a maximum number of slave devices capable of belonging to the first type of wireless network is N, wherein N is an integer of 1 or more,
    wherein the slave devices are each configured to operate in the slave status and to belong to the first type of wireless network,
    wherein the processor is configured to cause the first communication device to further operate as a first determining unit configured to determine whether the number of slave devices currently belonging to the first type of wireless network is less than N or equal to N, in a case where the first communication device operates in the master status and belongs to the first type of wireless network, and
    wherein the transmitting unit is configured to:
        in the first case where it is determined that the number of slave devices is less than N, transmit the first wireless settings to the second communication device; and
        in the second case where it is determined that the number of slave devices is N, transmit the second wireless settings to the second communication device.

4. The first communication device according to claim 1,
wherein the processor is configured to cause the first communication device to further operate as a forming unit configured to newly form the first type of wireless network for enabling the first communication device to operate in the master status in a case where the first communication device does not belong to the first type of wireless network, and
wherein the transmitting unit is configured to transmit the first wireless settings to the second communication device when the first type of wireless network is newly formed.

5. The first communication device according to claim 1,
wherein the transmitting unit is configured to transmit the second wireless settings to the second communication device in the second case where the first communication device operates in the slave status and belongs to the first type of wireless network.

6. The first communication device according to claim 1,
wherein the processor is configured to cause the first communication device to further operate as:
a second determining unit configured to determine whether the first communication device belongs to the second type of wireless network in the second case; and
a searching unit configured to search for a relaying device existing around the first communication device in a case where it is determined in the second case that the first communication device does not belong to the second type of wireless network,
wherein the transmitting unit is configured to:
in a case where it is determined in the second case that the first communication device belongs to the second type of wireless network, transmit the second wireless settings to the second communication device, the second wireless settings being for joining the second communication device to the second type of wireless network to which the first communication device belongs; and
in a case where it is determined in the second case that the first communication device does not belong to the second type of wireless network, transmit the second wireless settings to the second communication device, the second wireless settings being for joining the second communication device to the second type of wireless network that includes the specific relaying device of one or more relaying devices found by the searching.

7. The first communication device according to claim 6,
wherein the processor is configured to cause the first communication device to further operate as a selecting unit configured to select the specific relaying device from a plurality of relaying devices by using processing-related information related to processing of the target data in a case where the plurality of relaying devices has been found by the searching.

8. The first communication device according to claim 7,
wherein the searching unit is configured to obtain communication-related information from each of the plurality of relaying devices,
wherein each of the plurality of communication-related information obtained from the plurality of relaying devices includes at least one of:
authentication scheme information representing an authentication scheme which a relaying device, which is the source of the corresponding communication-related information, is using currently;
encryption scheme information representing an encryption scheme which the relaying device, which is the source of the corresponding communication-related information, is using currently; and
communication rate information representing a communication rate of wireless communication which the relaying device, which is the source of the corresponding communication-related information, used, and
wherein the selecting unit is configured to select the specific relaying device from the plurality of relaying devices by using the processing-related information and the plurality of communication-related information.

9. The first communication device according to claim 8,
wherein the selecting unit selects the specific relaying device by using the processing-related information and the plurality of communication-related information, the processing-related information including data-related information related to the target data.

10. The first communication device according to claim 9,
wherein the target data is data which is to be transmitted from the second communication device to the first communication device,
wherein the processor is configured to cause the first communication device to further operate as a receiving unit configured to receive the data-related information from the second communication device, and
wherein the selecting unit is configured to select the specific relaying device by using the processing-related information and the plurality of communication-related information.

11. The first communication device according to claim 9,
wherein each of the plurality of communication-related information includes the authentication scheme information representing the authentication scheme which is being used by the relaying device that is the source of the corresponding communication-related information, and
wherein the selecting unit is configured to:
in a case where the data-related information represents that the target data has a first level of security, select the specific relaying device using a first authentication scheme from the plurality of relaying devices; and
in a case where the data-related information represents that the target data has a second level of security that is lower than the first level of security, select the specific relaying device using a second authentication scheme, which is different from the first authentication scheme, from the plurality of relaying devices.

12. The first communication device according to claim 9,
wherein each of the plurality of communication-related information includes the encryption scheme information representing the encryption scheme which is being used by the relaying device that is the source of the corresponding communication-related information, and
wherein the selecting unit is configured to:
in a case where the data-related information represents that the target data has a first level of security, select the specific relaying device using a first encryption scheme from the plurality of relaying devices; and
in a case where the data-related information represents that the target data has a second level of security that is lower than the first level of security, select the specific relaying device using a second encryption scheme, which is different from the first encryption scheme, from the plurality of relaying devices.

13. A non-transitory computer-readable storage medium having a computer program stored thereon and readable by a computer of a first communication device, which is configured to operate in a master status or in a slave status and belong to a first type of wireless network, the computer program, when executed by the computer, causes the computer to perform operations comprising:

a transmitting process comprising:

transmitting first wireless settings, which is for joining the first type of wireless network, to a second communication device in a first case where the second communication device can join the first type of wireless network in a specific mode for performing direct wireless communication with the first communication device without intermediating of a relaying device; and transmitting second wireless settings, which is for joining a second type of wireless network, to the second communication device in a second case where the second communication device cannot join the first type of wireless network in the specific mode, wherein the second type of wireless network includes a specific relaying device configured separately from the first communication device and the second communication device; and a communicating process comprising:

in the first case, performing direct wireless communication of target data with the second communication device by using the first type of wireless network; and in the second case, performing wireless communication of the target data with the second communication device through the specific relaying device by using the second type of wireless network.

* * * * *